United States Patent [19]

LeCourt

[11] Patent Number: 4,931,896
[45] Date of Patent: Jun. 5, 1990

[54] DISTRIBUTION LINE SWITCHGEAR CONTROL WITH ISOLATED CASCADED POWER SUPPLIES

[75] Inventor: William N. LeCourt, Milwaukee, Wis.

[73] Assignee: Cooper Industries, Inc., Houston, Tex.

[21] Appl. No.: 712,012

[22] Filed: Mar. 14, 1985

[51] Int. Cl.⁵ .............................................. H02H 7/22
[52] U.S. Cl. ........................................ 361/73; 361/96
[58] Field of Search .................................... 361/71–75, 361/93–97, 155, 156

[56] References Cited

U.S. PATENT DOCUMENTS

| | | |
|---|---|---|
| 3,116,439 | 12/1963 | Riebs . |
| 3,381,176 | 4/1968 | Riebs . |
| 3,405,318 | 10/1968 | Gilker . |
| 3,412,289 | 11/1968 | Gilker . |
| 3,604,983 | 9/1971 | Levin et al. ............................ 361/95 |
| 3,662,220 | 5/1972 | Riebs . |
| 3,878,436 | 4/1975 | Bogel .................................... 361/72 |
| 4,000,446 | 12/1976 | Vandevier et al. ................ 361/96 X |
| 4,027,203 | 5/1977 | Moran et al. ......................... 361/98 |
| 4,103,316 | 7/1978 | Kaneko ............................ 361/74 X |
| 4,131,929 | 12/1978 | Moran ................................... 361/93 |
| 4,161,761 | 7/1979 | Moran ................................... 361/94 |
| 4,223,365 | 9/1980 | Moran ................................... 361/71 |
| 4,250,532 | 2/1981 | Dais ...................................... 361/96 |
| 4,293,834 | 10/1981 | Date et al. ............................. 335/76 |
| 4,345,292 | 9/1982 | Jaeschke et al. ....................... 361/94 |
| 4,352,138 | 9/1982 | Gilker ................................... 361/92 |
| 4,393,431 | 7/1983 | Gilker ................................... 361/97 |
| 4,428,022 | 1/1984 | Engel et al. ........................... 361/96 |
| 4,562,506 | 12/1985 | Moran ............................. 361/72 X |

OTHER PUBLICATIONS

Information of Togami Automatic Sectionalizer, "DM System", Togami Electric Mgs. Co., date unknown.
IC OP AMP Cookbook, Jung, Figures 5-9, 5-13, 1974.
McGraw-Edison Service Publications, KFE 10,001-E, KFE 10,002-E, May 1983.

Primary Examiner—Roy N. Envall, Jr.
Assistant Examiner—A. Jonathan Wysocki
Attorney, Agent, or Firm—Eddie E. Scott; Nelson A. Blish; Hubert E. Cox

[57] ABSTRACT

A distribution line switchgear control which is particularly suitable for use with recloser switchgear which requires small amounts of power from the control for operation. The control is most usefully powered for continued operation by small amounts of line current provided through a power source current transformer and includes multiple capacitors which are arranged in a cascaded control power supply having a plurality of isolated stages. The line current is precisely monitored through current transformers by the control which causes the recloser to trip, reclose and lockout, as is appropriate to protect the distribution line and distribution electricity. Inhibit means prevent the control from issuing a trip signal, unless sufficient energy exists in a trip portion of the cascaded power supply. A variety of volatile timers and counters enable the control to cause the recloser to trip, reclose and lockout. Initialization means, sensing the cascaded power supply, and a non-volatile state memory responsive to trip, close and lockout signals of the control, cause the initialization of the volatile and non-volatile elements to prevent inappropriate control signals.

5 Claims, 13 Drawing Sheets

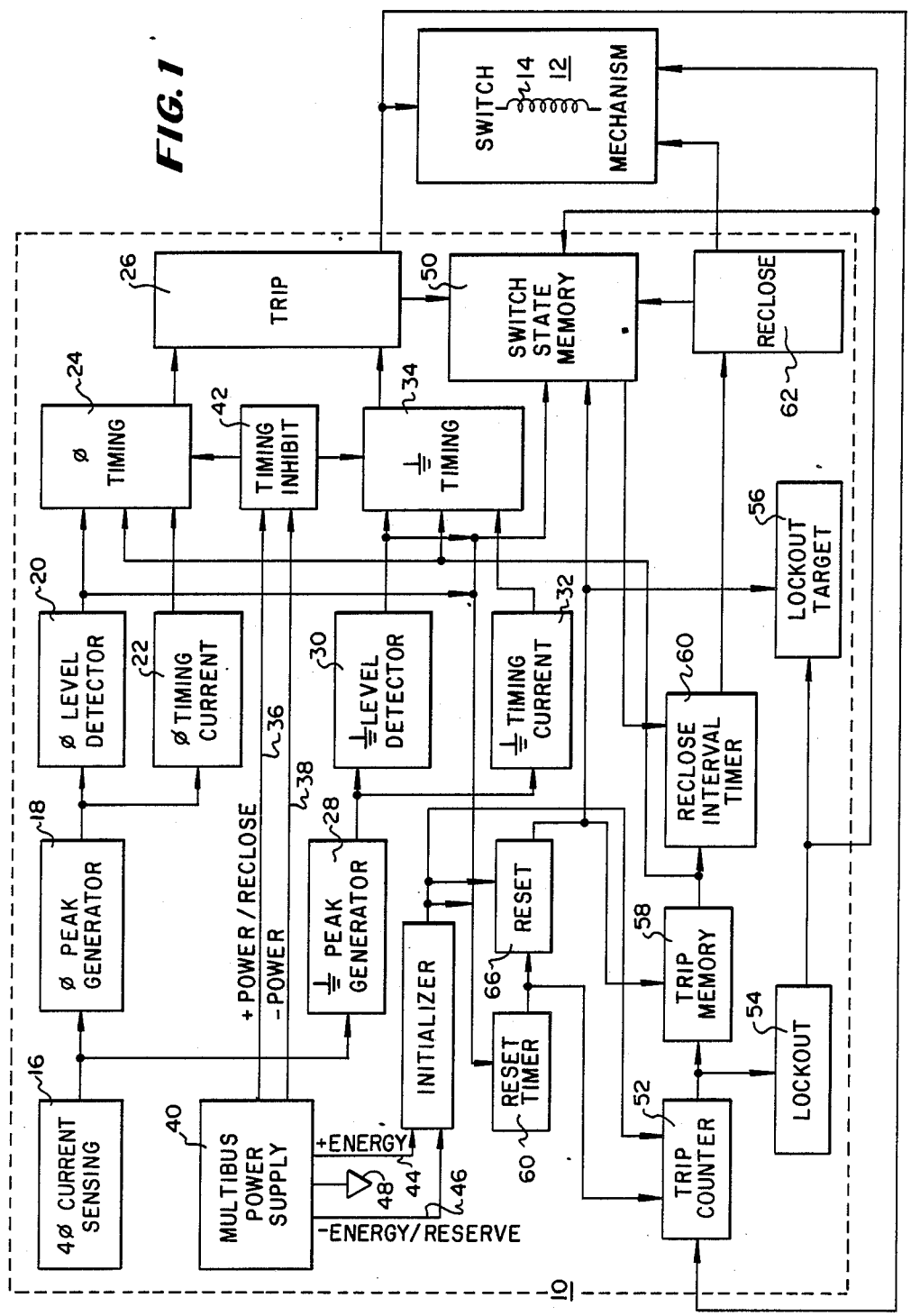

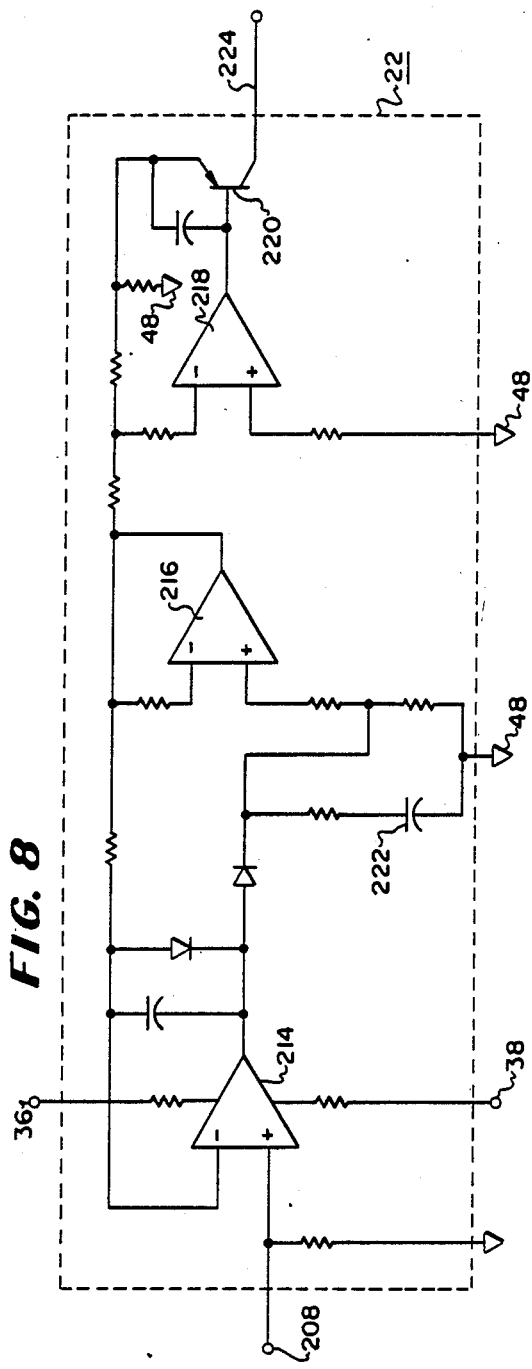
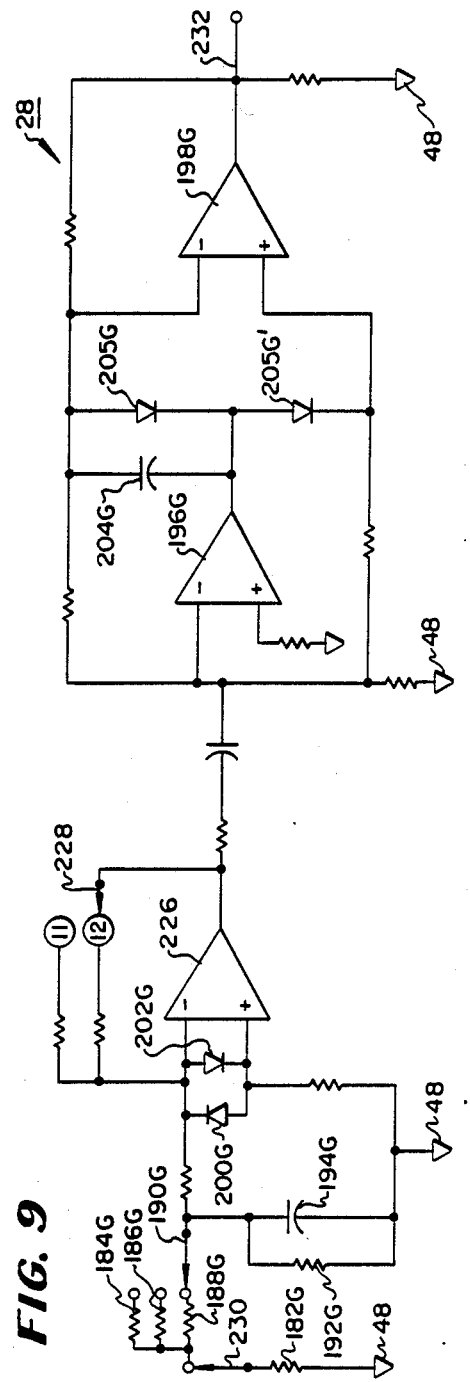
FIG. 8
FIG. 9

DISTRIBUTION LINE SWITCHGEAR CONTROL WITH ISOLATED CASCADED POWER SUPPLIES

BACKGROUND OF THE INVENTION

This application for patent of this invention is related to the following applications:

1. Distribution Line Switchgear Control Employing a Precision Rectifier invented by William N. LeCourt, Ser. No. 711804, McGraw-Edison Company;
2. Distribution Line Switchgear Control Including a Lockout Target invented by William N. LeCourt and Mark J. Ratzburg, Ser. No. 71011, McGraw-Edison Company.

The present invention relates to distribution line switchgear controls, and particularly relates to such switchgear controls which consume limited amounts of power in both quiescent and active states.

A network of power distribution lines must respond to normal variations of load requirements and to abnormal fault conditions for maintaining service to the greatest number of customers in an economical manner. To that end, a variety of switchgear is used to vary the interconnections among the distribution lines. By necessity much switchgear is located far from power distribution centers and must have stand alone capability. The types of switchgear employed include remotely actuated switches, sectionalizers, and closers.

Remotely actuated switches are controlled by a power distribution center and may include indicating means which signal their state or the occurrence of a fault on a distribution line. Switches may interrupt normal currents in a distribution line.

Sectionalizers are similar to remotely actuated switches but lack their ability to interrupt normal current. They are opened after an interrupting device has acted to interrupt their source.

Reclosers sense faults on a distribution line and open to interrupt faults (excessive current) a limited number of times within a short time interval. Most faults result from a temporary initiating condition, such as a branch brushing against a line. Once a fault resulting from a temporary condition is interrupted, the fault will not often reoccur until an initiating condition reoccurs. Faults resulting from a more permanent conditions such as a downed line are prevented from reoccurring by locking out or opening the contacts of a recloser until the cause of the fault is eliminated.

Switchgear should be located and coordinated in such a manner as to minimize the duration and area of power outage due to a fault condition.

Most switchgear requires considerable power for reliable operation. It is difficult to supply remotely located switchgear and switchgear controls with power sources which are both reliable, under normal and abnormal conditions, and inexpensive. Much switchgear is operated by springs which are tensioned to store energy under normal distribution line conditions. An example of spring operated switchgear is disclosed in U.S. Pat. No. 4,293,834 to Date et al. Switchgear controls likewise have some energy storage means to enable them to operate when their associated distribution line is disconnected.

Switchgear controls in a quiescent state, when they are not initiating a opening or closing of the distribution line switches, have relatively low power requirements. Typically, tens of milliamperes will suffice to keep a control reliably functioning in a quiescent state. However, when the switchgear control enters an active state to initiate opening or closing the distribution line switches, the power required rises dramatically. Typically, the control requirements will rise an order of magnitude or more. Amperes may be required in the active state. Occasionally, mechanisms which reduce the power requirements for some operations have been employed. An example of such a mechanism is a KFE Recloser manufactured by McGraw-Edison Company, assignee of the present invention, which employs a flux shift tripper to initiate the opening of distribution line switches. Increased power requirements for operating the control must be furnished by the energy storage means of the control. The energy storage means must either be maintained at a high level of storage or be very rapidly replenished.

The switchgear mechanisms which position the distribution line switches take a relatively long time to completely respond to a switchgear control signal. Those mechanisms which are oil filled take about a half second to completely respond. If the energy storage means can be maintained, or restored, to supply operating power within a half second, the switchgear control could initiate a close operation and then open immediately on the closing of distribution line switch. Restoring the switchgear control energy storage means within a half second would be considered adequate, even when the control is associated with mechanisms which respond much faster than a half second.

Controls for switchgear, which initiate movement of the mechanism, are often battery operated with the battery being charged under normal operating conditions. An example of a battery operated switchgear and control is disclosed in U.S. Pat. No. 3,116,439 to Riebs.

Some switchgear controls are operated from power capacitors which are charged by the distribution line under either normal or faulted conditions. An example of a power capacitor operated switchgear control is disclosed in U.S. Pat. No. 4,027,203 to Moran et al, which obtains its power from distribution line currents. Another example of power capacitor switchgear control is disclosed in U.S. Pat. No. 4,352,138 to Gilker which obtains its power from the voltage on the source side of the line.

Each energy storage means to provide switchgear control operating power has advantages and disadvantages. Battery operated switchgear controls are expensive and may become inoperative due to battery, or battery charging circuit, failures particularly when fault occurrences extend over a long period. A number of approaches to minimize failures exist. One approach, disclosed in U.S. Pat. No. 3,381,176 to Riebs et al, disconnects a battery after a successful closing operation or following a predetermined interval after a switch opening.

Capacitor powered switchgear controls avoid the expense of a battery but, usually will not maintain a state of charge as long as a battery and become uneconomical if the energy stored approaches that typically found in batteries. Often a single operation will severely deplete the amount of energy stored in a power capacitor of moderate size and cost. Depending on the size of the power capacitor and the loading in the active state, the voltage of the power capacitor and the control bus may fall on the order of five or more volts. If current transformers alone were used to restore operating voltage an undesirable period of unreliable control operation would result. A potential transformer on the source side of the switchgear may be employed to maintain charge on the power capacitor. However, such approaches, as disclosed in U.S. Pat. No. 4,352,138 to Gilker, require the addition of a potential transformer and in that invention two power capacitors. The second power capacitor operates to supply power in the event that the preferred potential transformer source of capacitor power and a secondary battery source both fail. Current transformers, necessarily present to monitor current in the distribution line, charge the second power capacitor at the expense of accuracy when charging occurs. The use of multiple sources of power to achieve greater reliability is not unusual and other approaches exist.

The use of current transformers to charge a power capacitor is particularly economical when the current transformer must be present to monitor distribution line current. However, there are difficulties associated with the use of the monitoring current transformers to charge a power capacitor. An additional dilemma involves the speed with which the capacitor is allowed to charge.

If the power capacitor is allowed to charge with great rapidity, sufficient current is drawn to adversely affect the accuracy of the current monitoring function of the control. A rapid charging of the second power capacitor in U.S. Pat. No. 4,352,138 to Gilker only occurs when the primary and secondary sources have failed. Additionally, U.S. Pat. No. 4,352,138 to Gilker discloses a circuit to prevent closing the distribution line switches when insufficient energy exists to allow the control to operate the switchgear to an open position.

Alternately the power capacitor may be placed in series with a sensing resistor which monitors phase currents as disclosed in U.S. Pat. No. 4,393,431 to Gilker, and U.S. Pat. No. 4,131,929 to Moran. However, the rate of charging the power capacitor is limited by the sensing resistor.

Alternately, the power capacitor may be charged and maintained at a more moderate rate with a less serious affect on the current monitoring function. However, during the period the power capacitor is being charged to an appropriate level, the control should be inactivated to prevent unreliable operation. U.S. Pat. No. 4,027,203 to Moran discloses one method of inhibiting control operation, while the power capacitor is being charged to an appropriate level. Similar dilemmas exists when the preferred source of supply for the power capacitor is either a potential transformer or a battery.

When a potential transformer is the preferred source, the designer must chose between providing a high or a low resistance path to the power capacitor. A low resistance path will rapidly charge the capacitor but results in vastly oversizing the transformer for an anticipated intermittent demand of the power capacitor. If the transformer is not oversized, an early failure may result under some conditions from overstressing the transformer to continuously supply what should be an intermittent demand. Alternately, if a high resistance path is chosen the power capacitor is unable to furnish sufficient power for reliable switchgear control operation for a longer period until the power capacitor has been charged.

If a battery is chosen as the preferred source for capacitor charging, the dilemma remains. A high resistance charging path results in longer periods of unreliable switchgear control operation while the power capacitor is being charged. A low resistance path will more rapidly exhaust the battery and require batteries of greater size.

Current transformers typically used in switchgear controls to monitor phase currents have ratios between the primary and secondary currents on the order of 1,000 to one. If 100 amperes is flowing through the primary of such a phase transformer, than one tenth of an ampere will flow through its seconday. One hundred milliamperes will in most cases be adequate to power the quiescent demands of the switchgear control.

Large capacitors on the order of 24,000 micro farads are used as power capacitors when the activating demands on the switchgear control are large. For every volt the power capacitor dips below the nominal bus voltage, the recovery time will be on the order of fifteen hundred cycles, if 100 amperes of alternating current is flowing in the distribution line. If the power capacitor relied on the current transformer alone and was five volts below nominal operating level, more than a second will elapse before the control is restored. Considering that the normal current on a distribution line may fluctuate an order of magnitude in a twenty-four hours the time to restoration may be in excess of ten seconds.

Some switchgear employ a momentary high voltage closing solenoid to close the distribution line switches. If the closing solenoid is appropriately fabricated, it may be employed to supply a low voltage power pulse during closing to the energy storage means of the switchgear control. An example of a switchgear control precharged to a predetermined energy level is provided by a type KFE control manufactured by McGraw-Edison Company the assignee of the present invention. While this type of momentary precharge entails additional components and expense, it avoids the above discussed dilemmas associated with capacitor charging speed. An alternate approach to momentary rapid capacitor charging, invented by Richard J. Moran, is disclosed in co-pending patent application Ser. No. 06/580,029, filed Feb. 14, 1984, which is owned by McGraw-Edison Company, assignee of the present invention. The Distribution Line Powered Control there disclosed is particularly suitable for use with switchgear which do not employ a momentary high voltage solenoid for closing the distribution line switches.

Remotely operated switches, as such, need not sense either current or voltage of their associated distribution lines. In contrast, both sectionalizers and reclosers usually sense at least distribution line current. An important point of distinction between them is that reclosers are designed to interrupt current, and that sectionalizers should not be opened while their distribution line switches are conducting current. Thus, a recloser control will measure current to determine, whether it should be interrupted and a sectionalizer control will sense the presence of current to determine whether the sectionalizer switches should remain closed.

Some sectionalizers, such as those manufactured by Togami Electric Mfg Co. Ltd. of Saga, Japan, like reclosers, employ trip counters which record the number of openings of the switches and lockout after a given number of operations The Togami type DM Systems have a reset function to initialize the trip counter after a predetermined period of conducting current in a manner similar to reclosers. Additionally, these type DM sectionalizers employ a reclose interval timer, which causes closing of the switches after a defined event. In these sectionalizers, the defined event is the existence of voltage in a distribution line. In a recloser, the reclose interval timer commences timing on the opening of the switch.

Given the nature of reclosers, and typically, their associated current transformers, a variety of schemes exist to provide accurate measurement of distribution line current over an extended range. Until saturation, current transformer output is basically linear, often in the ratio of 1,000 to 1 for distribution line current monitoring As a result of this ratio, one ampere will flow in the secondary of the current transformer, when 1,000 amperes of current is flowing in the primary The secondary current is induced to flow through a sensing resistor, often providing about five ohmns of resistance. The current transformers have an associated internal impedance which introduces a nonconstant loading factor over ranges commonly used. Given previously used sensing schemes, this normally results in an inability to accurately sense distribution line ground current below 5 amperes or above 400 amperes. This range of 80 times the minimum ground fault current is acceptable in the United States, but is not acceptable in some foreign countries. Accessories are available to basic controls which sense down to one ampere of ground current. The accessories have some adverse affects on the precision in sensing and have a very restricted range of ground current sensing. These previously used schemes can, of course, be inexpensively modified to move the range of accurate sensing upwards or downwards by modifying the current transformer ratio or by modifying the value of the resistance of the sensing resistor. However, attempts to broaden the range have resulted in unacceptable control expense for most non-specialized controls.

Typically, reset and reclose interval timers in reclosers have been activated by contacts associated with the distribution line switches in the switchgear. This contact actuation is economical, but has associated drawbacks. First, the contacts have to be available in the recloser switchgear limiting the connection of any given control to any given switchgear. Secondly, every connection between a switchgear and a control potentially couples noise into the control, which may cause malfunction. The use of solid state integrated circuits in switchgear controls have made them more sensitive to noise. The more recent generation of controls employing integrated circuits have, in many cases, an additional drawback, since their memories are volatile and dependent on the continued supply of adequate power.

Application Ser. No. 06/615,563, filed May 31, 1984, for a Recloser Control with Independent Memory, invented by Thomas Bray, and owned by McGraw-Edison Company, assignee of the present application, discloses a means of activating reset and reclose timing in a microprocessor based recloser control, which is not based on switchgear contact sensing. One of the disclosed means for achieving an independent memory is through the use of a latching relay, which inherently provides high noise immunity, because of the relatively high coercivity associated with a change of state of the relay.

SUMMARY OF THE INVENTION

The present invention provides a distribution line powered control which is more accurate, economical, flexible, and reliable for repeated operations, under normal and abnormal conditions, than its forerunners.

The control employs precision rectifiers in sensing distribution line current. As a result, a variety of linear monitoring devices may be used, including current transformers, linear couplers, and coaxial shunts, so long as the device output is roughly in the range of milli-volts per ampere. The control incorporating the precision rectifiers will respond to distribution line current in the range of 5-1600 amperes and selectively respond to the phase carrying the greatest amount. The range of ground current to which the control will respond is 400 times the minimum ground fault current of one ampere. As well as accepting inputs from a variety of line monitoring devices, the control may also be used to control a variety of switchgear.

The flexibility to control a variety of switchgear is achieved by incorporating a high coercivity, non-volatile, independent state memory activated by the control signals. The state of the memory is thus independent of the type of switchgear which is being controlled, and is preserved despite loss of power supplied to the control. Changes to the state of the memory require comparatively large amounts of energy, which increases the noise immunity of the memory. A visual lockout indicator, or target is provided for recloser switchgear in order that the switchgear may be coordinated with the control.

Energy is stored in three isolated energy storage means so that diminution of energy in one storage means does not affect the others. If a trip energy storage device is fully charged, then a reclose and a reserve energy storage device are also fully charged. The sequence for allowed decrease in energy among the devices is trip, then reclose and lastly reserve energy device diminution. Trip means and reclose means within the control are respectively supplied relatively high amounts of power by trip and reclose energy storage means. These energy storage means also furnish the power required by the independent memory. The reserve energy storage device furnishes the limited power needed by devices controlled by the state of the memory. Such devices, mainly counters for determining the next control operation, should not consume much power, so that power supplied to the control may be interrupted for long periods without degradation of control function. If the energy in the reserve energy storage device becomes insufficient to supply sufficient power to the devices supplied, an initializer returns the control to an initial state as power is resupplied to the control. Power is supplied to the control through a power source which replenishes power consumed by the control. Although, the power source is adequate to replenish power, it would take an unacceptable period of control inoperability to recharge the energy storage devices. A charging power source is therefore provided to supply sufficient power to recharge the storage devices.

The control is most usefully employed in conjunction with switchgear which require relatively little power to initiate a change of state.

BRIEF DESCRIPTION OF THE DRAWINGS

FIG. 1 is a simplified functional diagram of the control of the present invention and portions of controlled switchgear;

FIG. 8 illustrates a phase timing current means of the control.

FIG. 9 illustrates a ground peak generator portion of the control.

DETAILED DESCRIPTION OF THE DRAWINGS

Figure 2A:
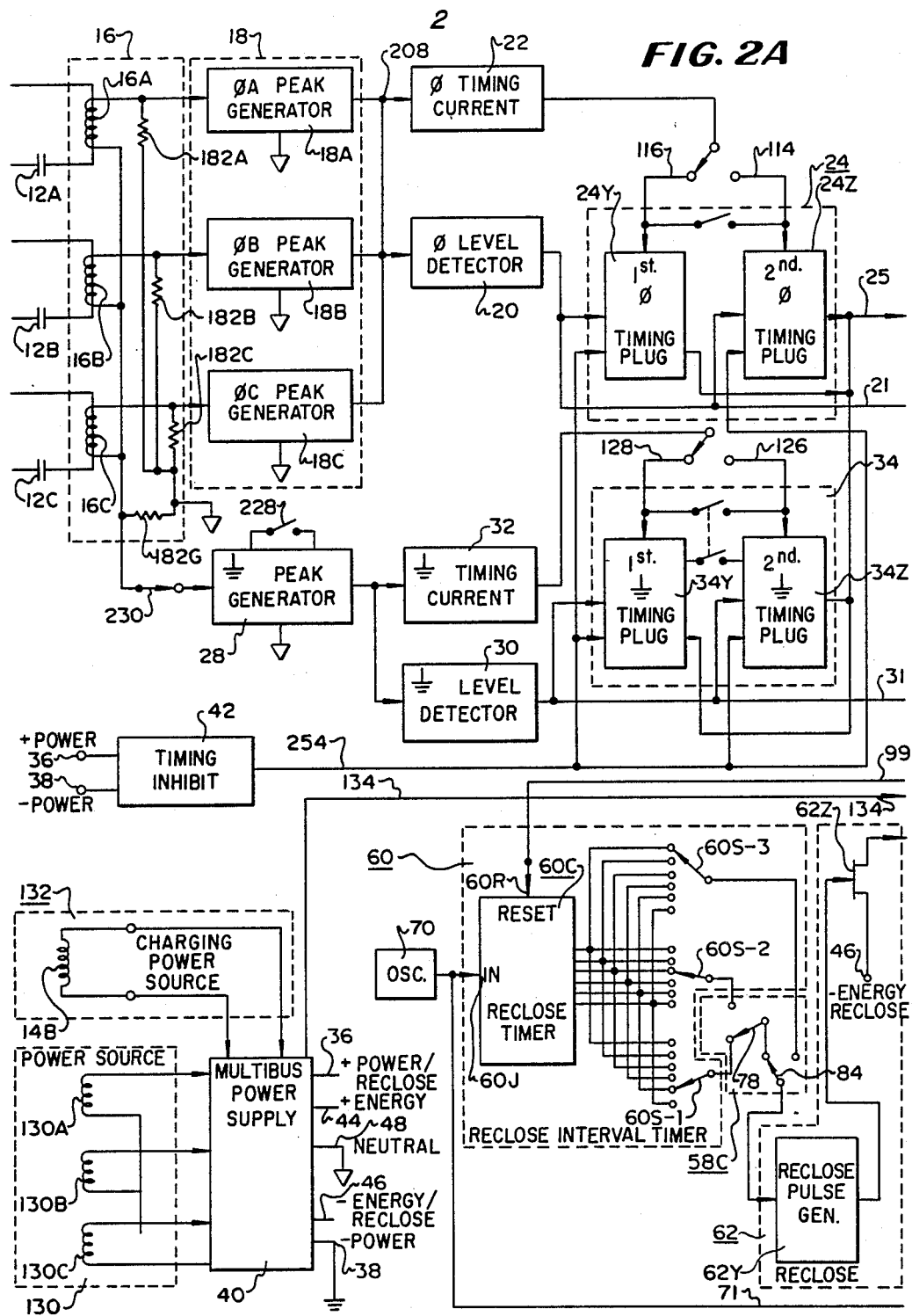
FIG. 2A and B, is a functional diagram of the control and portions of controlled switchgear.

A distribution line switchgear control of the present invention is disclosed in the simplified block diagram in FIG. 1 of the drawing. Control 10 is employed to control switches in switchgear mechanism 12, which govern current flow in a distribution line. Switchgear mechanism 12 is symbolically shown as having a single solenoid 14 which initiates switchgear movement.

Control 10 performs functions of the type generally used to control reclosing switchgear. Current in the distribution line is sensed by four-phase current sensing means 16, operatively connected to a distribution line to be protected. The alternating current signals produced by the four-phase current sensing means 16 are provided in two paths. One path rectifies and maintains a peak signal proportional to the highest current present among three phases of the distribution line. Phase peak generator 18 supplies a phase peak signal to a phase level detector 20 and a phase timing current means 22. The phase level detector 20 compares the magnitude of the phase peak signal with a predetermined signal level equivalent to a predetermined level of phase current in the distribution line, and provides a current present signal to a phase timing means 24, when the peak signal exceeds that predetermined value. Phase timing current means 22 provides a timing current proportional to the phase peak signal to the phase timing means 24 where it is effectively compared against a time current characteristic to see whether or not, a fault of sufficient magnitude has existed for a sufficient period of time, to justify interrupting current in the power distribution line. Often the phase timing means 24 is an inverse time current curve generator which may exceed a given time current curve in proportion to the reciprocal of the integrated product of the phase timing current and its duration. An earlier embodiment of an invention to generate such a function is shown in U.S. Pat. No. 3,662,220, owned by the assignee of the present invention. When the distribution line current exceeds a given predetermined level for a sufficient period of time, or is faulted for a sufficient period of time, the phase timing means 24 causes trip means 26 to be activated to issue a trip signal. The trip signal from trip means 26 is operatively connected to actuating solenoid 14 in switchgear mechanism 12, to initiate the opening of the distribution line switches.

Current sensing means 16 also provides a signal representative of the distribution line ground current to ground peak generator 28. Ground peak generator 28 provides a ground peak signal to ground level detector 30, and to ground timing current means 32. Ground level detector 30 and ground timing current means 32 supply their respective signals to ground timing means 34, which in turn controls trip means 26, in the same manner as the similarly named phase components earlier described. In general, ground faults existing in power distribution lines are of significantly lesser magnitude than phase faults. As a result, they should be separately processed to insure proper operation of control 10.

Trip means 26 provides power to solenoid 14 sufficient initiate a trip, or opening, of the distribution line switches associated with switchgear 12. The power is obtained through a positive power/reclose bus 36 and negative power bus 38, which are supplied power by multi-bus power supply 40. It is not desirable to issue a trip signal from trip means 26, when the power available through power buses 36,38 is insufficient to cause solenoid 14 to initiate an opening of the switches in switchgear mechanism 12. To avoid issuing a trip signal when the power is insufficient, power buses 36,38 are monitored by timing inhibit means 42. Normally, the voltage between power buses 36,38 is approximately 18 volts. When the voltage between power buses 36,38 falls below approximately 17 volts, reliable operation of solenoid 14 is not assured. Unless the voltage between the buses 36,38 is in excess of 17 volts, timing in phase timing 24 and ground timing 34 means is inhibited. As a result, trip means 26 is unable to issue a trip signal.

Multi-bus power supply 40 is operatively connected to the distribution lines to be protected by control 10 to furnish power for control 10 through a plurality of isolated buses. In addition to power buses 36,38, power is supplied through positive energy bus 44 and negative energy/reclose bus 46. A neutral 48 is also established midway between the voltage difference between power buses 36,38 which serves as a zero voltage reference.

Every fault current in the power distribution line does not threaten the integrity of distribution system. Those fault currents that will threaten the integrity of the distribution system will do so within the parameters established within timing means 24,34. Care must be taken to insure that the temporary existence of fault currents does not accumulate and cause unnecessary interruption in power distribution. Level detectors 20,30 insure that timing means 24,34 do not continue timing for temporary faults by initializing the detectors when the fault current falls below the preselected value.

In addition to initiating the opening of switches in switchgear mechanism 12, signals issued from trip means 26 also alters the condition of state memory 50. State memory 50 assumes conditions which indicate whether or not the distribution line switches in switch mechanism 12 should be open or closed.

A signal from trip means 26 is also received by a trip counter 52, which is a volatile counter. Counter 52 counts each successive trip signal up to at least the number of trips which will initiate a lockout condition. When lockout means 54 receives an indication from trip counter 52 that the number of trips to lockout has occurred, lockout means 54 initiates a lockout signal, which causes switch mechanism 12 to assume a lockout state. In a locked out state, switch mechanism 12 is unable to close. Additionally, the lockout signal causes a visual indicator, lockout target 56, to indicate that a lockout condition exists.

Unless a lockout condition exists, control 10 should cause switchgear 12 to close following a preselected period after a trip has occurred. This reclose function is initiated through state memory 50, reclose interval timer 60, and reclose means 62. Trip memory 58 has a number of memory elements equal to at least the number of trips to lockout less two. It is preferably a highly coercive and non-volatile memory. When a signal causes trip counter 52 to count a trip, the memory elements change state in trip memory 58 to reflect the trip count. The state of the memory elements in trip memory 58 is received by reclose interval timer 60, which commences to time out a preselected reclose interval from the issuance of the trip signal. While there is some delay between issuance of a trip signal and the commencement of timing out in the reclose interval timer 60, the delay is insignificant, as will later become apparent, in comparison with the interval timed out. After the interval is timed out, reclose interval timer 60 issues a reclose interval signal to reclose means 62. In response to the reclose interval signal, reclose means 62 issues a close signal to solenoid 14 in switchgear mechanism 12, which initiates the closing of the distribution line switches. The close signal is also received by switch state memory 50, which alters its state to reflect the fact that the distribution line switches should be closed.

In a manner similar to the function of level detectors 20,30, in resetting timing means 24,34 to prevent the accumulation of marginal faults causing unnecessary outages, reset timer 64 in cooperation with reset means 66, prevents the occurrence of power outages due to unnecessary lockout conditions. There is no purpose in causing a lockout condition, regardless of the magnitude of fault, unless faults occur within a short period of time which indicates that the condition causing the fault is rapidly reoccurring, or is of a permanent nature. Reset timer 64 commences counting down the reset interval after a close signal has been issued by reclose means 62. Reset means 66 receives a reset interval signal from reset timer 64, when that period has elapsed, unless level detector 20,30 issue a current present signal which interrupts the countdown of reset timer 64. Reset means 66 on receiving a reset interval signal issues a reset signal which resets the trip memory 58 elements to indicate that trips numbered two through one less than the number of shots to lockout have not occurred. By so doing, unnecessary lockout signals are prevented. The reset signal additionally is received by the lockout target 56, and causes lockout target 56 to assume a condition indicating that lockout does not exist. Lastly, the reset signal is received by switch state memory 50, and causes switch state memory 50 to assume a condition indicating that switch mechanism 12 should have closed its distribution line switches.

Energy buses 44,46 are monitored by an initializer 68 to insure that sufficient energy exists in the energy buses for powering all volatile state devices in control 10. As much as possible, complimentary metal oxide semi-conductor devices have been used in control 10 to minimize demands on stored energy in multi-bus power supply 40. Initializer 68 provides an initialization signal shortly before energy bus 44,46 voltage exceeds 5 volts. This initialization signal returns all volatile state devices, including the trip counter 52 to their initial states.

Figure 2B:
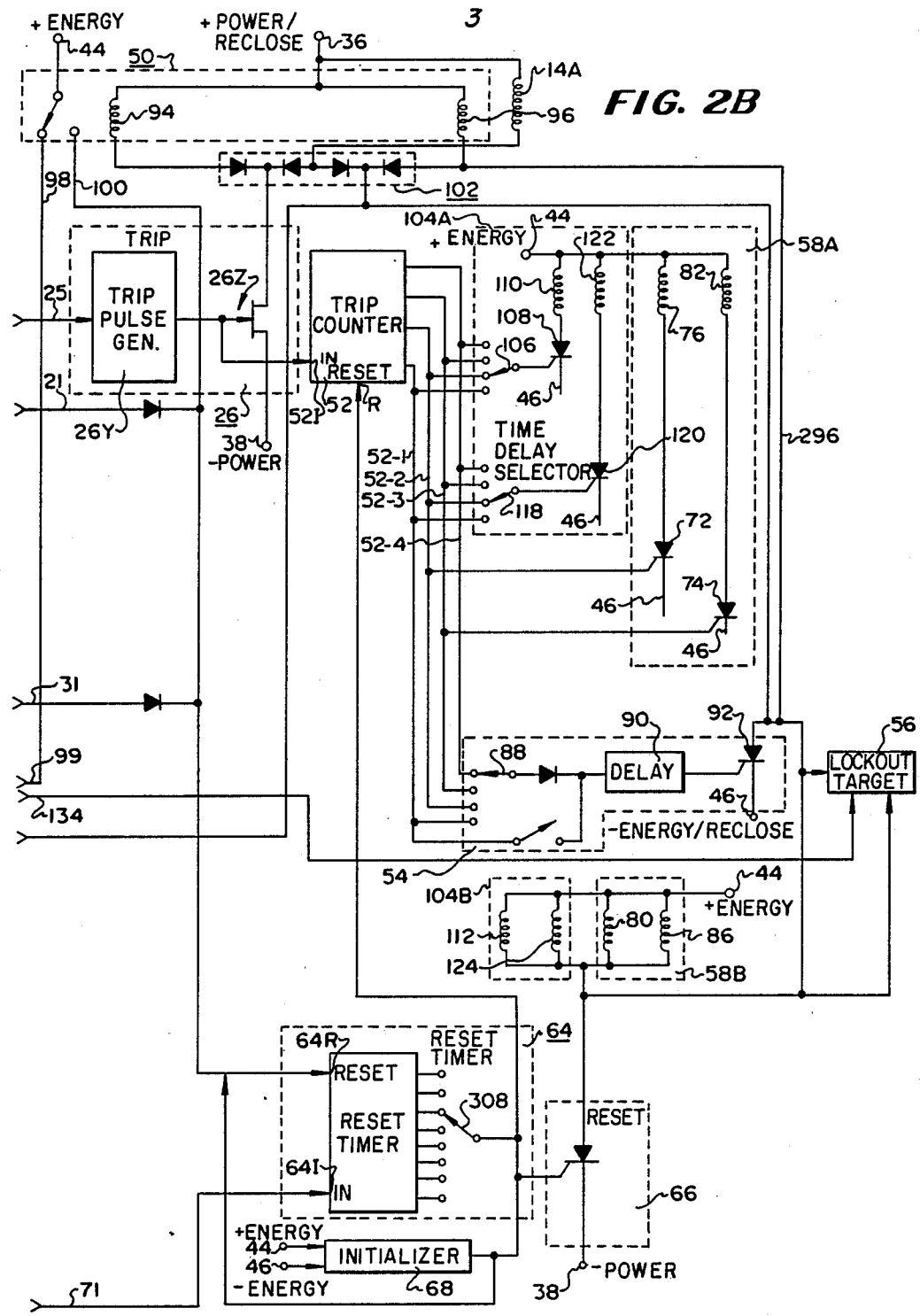

FIG. 2A and B shows a block diagram of the invention. It differs from FIG. 1 in illustrating additional functions and additional components. Conductors 71,134,99,31,21 and 25 in FIG. 2A may be aligned with those in FIG. 2B to facilitate an understanding of the signal paths. For example, in the upper left corner of the FIG. 2A, switch contacts 12A,B,C, contained in switchgear mechanism 12 for interrupting current in Phase A, B, and C of a power distribution line, are shown. Current sensing means 16 comprise three current transformers 16A, B and C, each respectively sensing distribution line currents in Phases A, B, C. The secondaries of the current transformers are connected in a Y connection to thereby generate a signal which is reflective of any ground phase currents that may exist. Phase peak generator 18 comprises peak generators 18A,B,C, each generating a respective phase peak signal in a manner later described. Phase timing means 24 comprises a first phase timing plug 24Y, and second phase timing plug 24Z, which may be alternately selected to effectively generate one of two time current characteristics. Similarly, ground timing means 34 comprises a first ground timing plug 34Y, and a second ground timing plug 34Z, which alternately are selected to cause one of two time current characteristics to be employed. Trip means 26 includes a trip pulse generator 26Y, which responds to phase timing means 24, and controls solid state trip switch 26Z. The trip pulse signal in addition to controlling solid state switch 26Z triggers trip counter 52. In a similar fashion, reclose means 62 includes reclose pulse generator 62Y and solid state reclose switch 62Z. Trip counter 52 is shown in an expanded fashion to indicate that it responds to the number of trip signals received at input 52I, and is reset by either reset timer 64 or initializer 68, through reset input 52R. The output lines of counter 52 indicate the number of trips counted as 52-1, 52-2, 52-3 and 52-4, which respectively indicate that the count is 1, 2, 3, or 4. Counters in the reclose interval timer 60 and reset timer 64 have been similarly expanded to show their input and reset lines. Oscillator 70 provides its signal to timers 60,64 through conductor 71, so that they may timeout their respective functions in a manner later described. It should be noted that the response of reclose means 62 to reclose interval timer 60 may be varied by selection among the output lines of reclose time counter 60C by switches 60S-1, 60S-2, and 60-S3. Trip memory 58 is also shown in an expanded fashion. The recloser control 10, as illustrated, will lockout after a maximum of four trips. Consequently, there are two memory elements in trip memory 58. Trip memory 58 is appropriately distributed in various portions of FIG. 2 to enhance the ready understanding of its functions. Portion 58A contains activating elements 72 and 74 respectively controlling the state of the memory element for the second and third trip. Each memory element is a bi-stable relay having a set coil and a reset coil which controls the state of associated contacts. These relays function as high coercivity non-volatile independent memories as does the relay employed in switch state memory 50. In connection with the second trip memory element, second trip activating element 72 is strobed by output 52-2 of trip counter 52 when two trips have occurred. When activating element 72 conducts, it causes current to flow through second trip set coil 76.

As a result, contacts in the relay assume a set position. Second trip contact 78, shown in association with reclose interval timer 60, is shown in the unset position. The reset coils associated with these memory relays are shown in portion 58B of FIG. 2. Second trip reset coil 80 is activated by reset means 66. When reset, contact 78 assumes the position shown in FIG. 2. Aside from being activated by trip counter 52 output line 52-3, similarly named components associated with the third trip memory element function in the same manner. These components are third trip set coil 82, third trip contact 84, and third trip reset coil 86.

Lockout means 54 is also shown in an expanded fashion in FIG. 2. Lockout means 54 comprises lockout switch selector 88, lockout delay element 90, and lockout activator 92. When trip counter 52 activates the trip line selected by lockout selector switch 88, lockout activator 92 energizes solenoid 14A in switchgear 12 after a delay of a preselected period generated in delay element 90. Coincidentally, switch state memory 50 assumes a closed state in anticipation of a next-to-come close signal.

Switch state memory 50 includes trip state coil 94, close state coil 96, close reset contact 98, and trip reset contact 100. As shown in FIG. 2, close reset contact 98 is closed connecting reset input 60R of reclose time counter 60C to the positive energy bus 44 through conductor 99. This illustrated position causes a reset of counter 60C, and is a result of either a close signal or a lockout signal activating close state coil 96. Steering diodes 102 appropriately isolate elements of switch state memory 50 from each other, and from solenoid 14A. Other unlabeled diodes in the Figure serve similar steering and isolating functions as is appropriate.

Four new functions or elements are shown in FIG. 2. The first is time delay selector means 104 adjacent trip memory portion 58A. Generally, the components of time delay selector means 104 function in a manner similar to the components of trip memory 58. As earlier discussed in connection with phase timing means 24 and ground timing means 34, each may time along one of two time current characteristics. In general, it is desirable to select a fast time current characteristic and a slow time current characteristic to be used in the respective timing means. Many faults occur as a result of a momentary rare condition in the power distribution line. The only thing needed to restore the power distribution line to its function is a momentary interruption of current in the power distribution line. As a result, earlier trips are generally selected to time along the fast time current characteristic. Some faults are due to a condition which is not momentary and is of a semipermanent nature. If fault current is allowed to flow in the distribution line for short period of time, the conditions ma be removed by the energy dissipated by the fault. As a result, higher number of trips are generally timed along a slower time current characteristic. Time delay selector means 104 allows a operator to select which time current characteristic is followed in timing means 24,34. Second phase timing plug 24Z is selected by phase time delay selector means in time delay selector means 104. Phase time delay selector means comprise phase time switch 106, phase time activator 108, phase set coil 110, and phase reset coil 112. As shown in FIG. 2, phase time switch 106 is in a position to cause second phase timing plug 24Z to be employed for all faults after the second trip signal until a reset originating in reset means 66 occurs. When trip counter output 52-2 is strobed as a result of a second trip signal, phase time activator 108 causes current to be conducted through phase set coil 110, which causes timing current from phase timing current means 22 to be directed to timing plug 24Z through second phase contact 114. As shown in FIG. 2, phase timing current is being conducted to timing plug 24Y through first phase contact 116. When reset means 66 is activated, for whatever reason, the reset signal causes all time delay selector means to assume the contact closures shown in this Figure. Phase set coil 110, phase reset coil 112, second phase contact 114, and first phase contact 116 comprise a phase delay relay. Like other relays of control 10, it is a preferable form of a high coercivity, non-volatile memory. Selection of second ground timing plug 34Z in ground timing means 34 is achieved in an analogous manner by similarly named components for ground delay selection in time delay selection means 104. These components are: ground time switch 118; ground time activator 120; ground set coil 122; ground reset coil 124; second ground contact 126 and first ground contact 128.

The remaining three new functions, indicated in FIG. 2, are associated with multi-bus power supply 40. Power source 130 is operatively connected to power distribution lines protected to provide power to multi-bus power supply 40, which stores energy and supplies power to control 10. Current transformer secondaries 130A,B,C are connected in a Y fashion to obtain power from Phases A,B,C of the power distribution line. Charging power source 132 is operatively connected to a closing solenoid in switchgear 12 to provide a momentary power pulse. The power pulse is sufficient to charge energy storage means in multi-bus power supply 40 to a predetermined energy level sufficient to allow control 10 to operate for a period of time when power provided through power source 130 is interrupted. When charging power source 132 provides the charging power pulse, power pulse reset line 134 insures that lockout target 56 assumes a state to visually indicate that the switchgear mechanism is not in a lockout condition. The remaining Figures of the drawing show circuitry in detail to enable the before discussed functions to be carried out.

Figure 3:
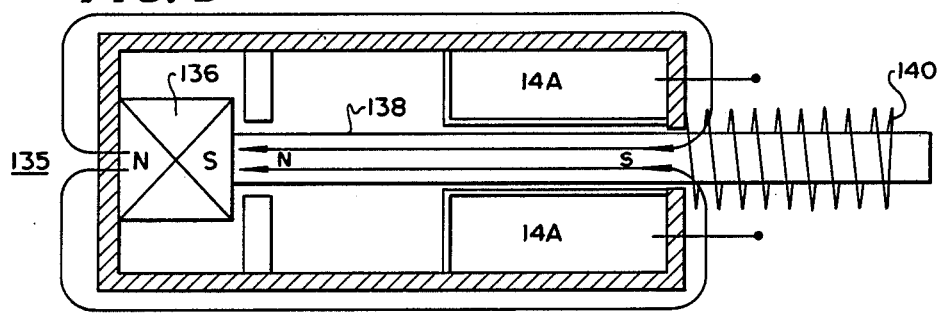
FIG. 3 is a symbolic view of a low energy actuator usefully employed in controlled switchgear.

However, before discussing the detail circuitry of control 10 shown in remaining Figures, it may be useful to detour to discuss aspects of switchgear 12. An understanding of aspects of switchgear 12 might lead to a quicker understanding of how control 10 is best employed. Among the improvements embodied in control 10, is the improvement of providing multi-bus power supply 40. Power supply 40 allows control 10 to remain operative through extended periods of power outage to the control 10 resulting from interrupting the power distribution line which is protected by control. Control 10, as will later be described in detail, employs a plurality of energy storage devices which provide power to its buses. Preferably, the energy storage devices are capacitors of relatively low capacity. To best utilize the control, it is desirable that the control be coupled with switchgear which does not require a great deal of power from the control to initiate its various functions. In a recloser, these functions would be a trip, a close, and a lockout. The switchgear preferably employs a single flux-shift tripper to initiate all functions of the recloser control. Flux-shift tripper 135 is illustrated in FIG. 3 of the drawing herein. Without going into unnecessary detail, flux shift tripper consists principally of a permanent magnet 136, plunger 138, spring 140, and coil 14A.

Flux shift tripper 135 is a bi-stable device. In one position plunger 138 is held abutting permanent magnet 136 against the bias of spring 140. In the other position plunger 138 is extended by the spring bias of spring 140 to a fully extended position. The transition from the first state is achieved by briefly energizing coil 14A in a manner to produce a magnetic flux counter to that provided by permanent magnet 136. As a result, the biasing force provided by spring 140 causes plunger 138 to move to the extended position. Plunger 138 is returned to the first position by a mechanism associated with switchgear 12. Extension of plunger 138 initiates all operations of reclosing switchgear 12. If the recloser is in an open state it closes. If it is in a closed state it opens. If within a short period of time of a beginning of an opening movement of switchgear 12 flux shift tripper is again pulsed, reclosing switchgear 12 enters into a lockout state. A flux shift tripper is a particularly desirable actuating mechanism to be used in conjunction with control 10, because it only requires approximately 29 millijoules of energy to move to the extended position which activates switchgear 12.

Figure 4:
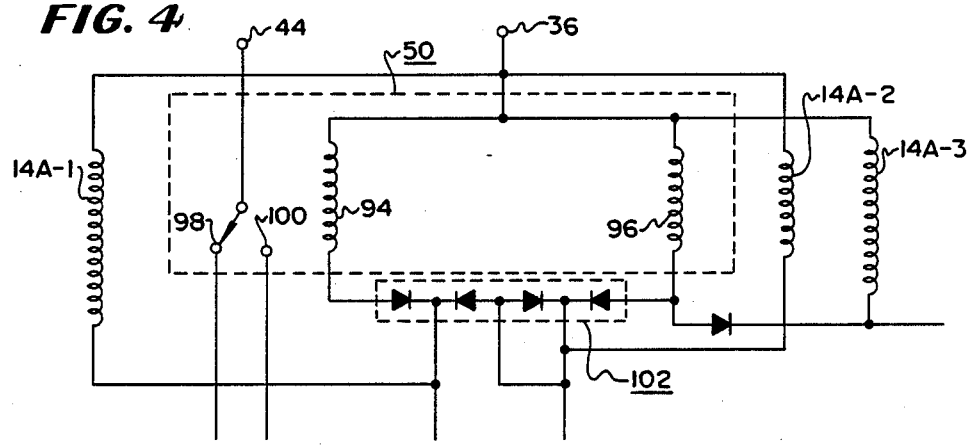
FIG. 4 is an alternate embodiment of switchgear actuator circuits which may be used with the control.

While the switchgear to be used with the control is most preferably of the type described in the foregoing paragraph, control 10 may be used with other switchgear. For example, a plurality of flux shift trippers could be employed to initiate all the required functions of a recloser. FIG. 4 illustrates the connections to be employed when multiple flux shift trippers are used. As in FIG. 2, trip state coil 94 is connected to trip means 26, and close state coil 96 is connected to close means 62. As might be readily inferred, flux shift tripper coil 14A-1 is also connected to trip means 26. Flux shift tripper coil 14A-2 is connected to close means 62. Flux shift tripper coil 14A-3 is connected to lockout means 54. Low energy solenoids could similarly be employed.

Figure 5:
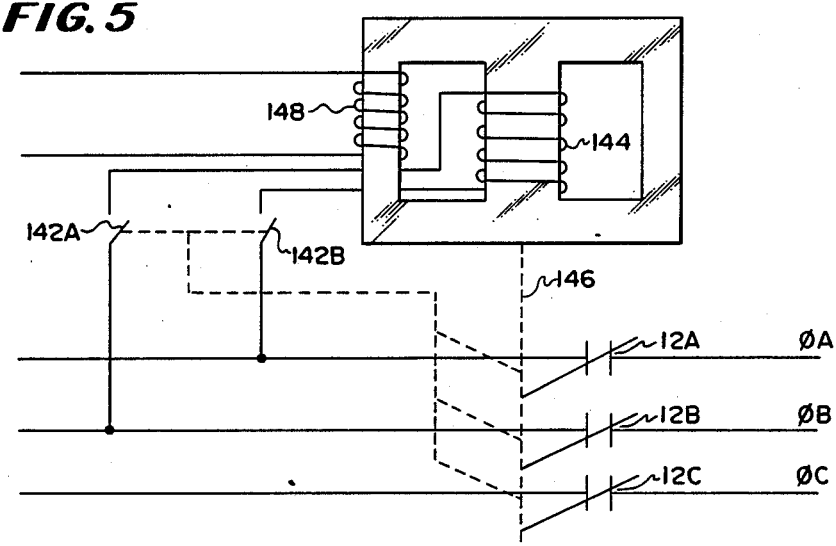
FIG. 5 illustrates an embodiment of high potential closing solenoid in controlled switchgear.

FIG. 5 displays the closing solenoid employed in switchgear mechanism 12 to close contacts 12A, 12B, and 12C. Flux shift tripper 134 causes closure of switches 142A and 142B connecting coil 144 across phases A and B of the power distribution line. As a result, the flux produced by solenoid coil 144 causes movement of armature 146 closing switches 12A,B,C. When switches 12A, 12B, and 12C are closed mechanical coupling between them and switches 142A and 142B forces switches 142(a) and 142(b) open. Solenoid coil 144 is magnetically coupled to solenoid secondary 14B. As generally indicated in FIG. 2, solenoid secondary 14B provides a pulse of power to the multibus power supply 40.

Figure 6:
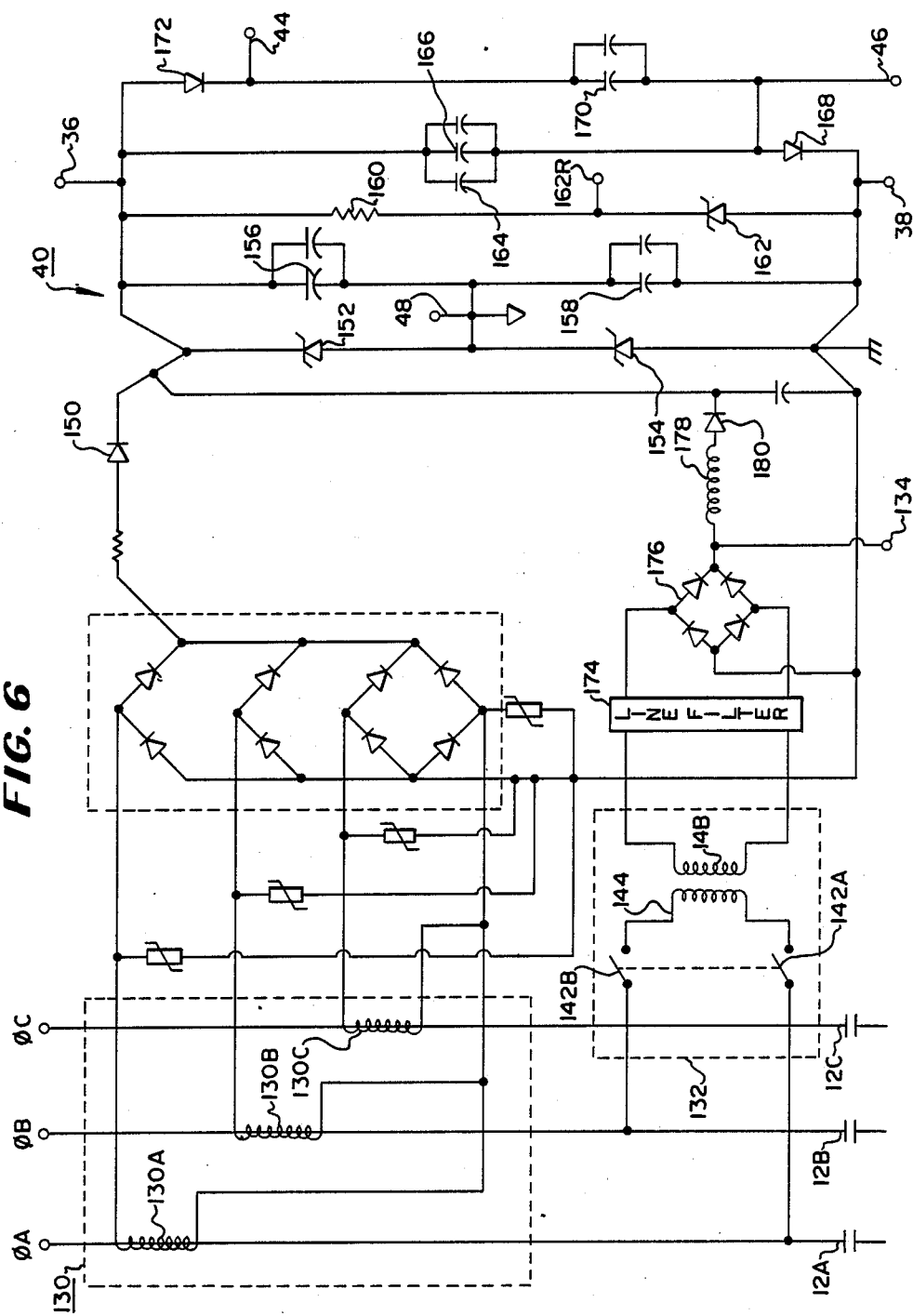
FIG. 6 illustrates a power supply portion of the control.

Returning to a description of circuitry in control 10, FIG. 6 shows multibus power supply 40 and associated components. Current transformer secondaries 130A, 130B, and 130C, connected in a star configuration, supply their current to power rectifier means 148. Each input connection of rectifier means 148 is protected by a varistor to prevent excessive voltages. The cathode of rectifier means 148 establishes negative power bus 38. The anode of rectifier means 148 is conventionally connected to a resistor and isolating power diode 150. The cathode of isolating power diode 150 establishes positive power bus 36. Power Zeners 152,154 are connected to each other to regulate the voltage between power buses 36,38 and establish neutral bus 48. Trip capacitor 156 is connected between bus 36 and neutral bus 48. Trip capacitor 158 is connected between neutral bus 48 and negative power bus 38. Power Zeners 152,154 act as a voltage regulating means to govern a maximum voltage difference between buses 36 and 38. Trip capacitors 156,158 act as a trip energy storage device to store trip energy. Also connected between buses 36 and 38 is the series combination of resistor 160 and timing Zener 162, to establish a reference in timing means 24,34. Reclose capacitors 164,166 are connected in parallel with each other and have a first terminal connected to positive power bus 36. Their second terminal is connected to the anode of reclose diode 168. The cathode of reclose diode 168 is connected to negative power bus 38. Reclose diode 168 prevents discharge of energy stored in reclose energy storage device capacitors 164,166 into trip energy storage device capacitors 156,158. The second terminal of reclose energy storage device capacitors 164,166 establishes reclose energy bus 46. Reserve capacitor 170 is also connected to negative reclose bus 46 at its first terminal. A second terminal of the reclose energy storage capacitor 170 is connected to the cathode of reserve diode 172. The anode of reserve diode 172 is connected to positive power bus 36, and reserve diode 172 prevents discharge of energy stored in reserve capacitor 170 into either the reclose energy storage devices 164,166 or the trip energy storage devices 156,158. The second terminal of reserve capacitor 170 establishes positive reserve energy bus 44. Each storage device is bypassed by a bypass capacitor. The energy storage capacity of the reclose energy storage device is approximately eight times that for the trip energy storage device. This allows extended periods of power outage to control 10. Since many of the components used in timing require very little power, reserve energy storage device may be something less than a half of the energy storage capacity of trip energy storage device. Power source 130 provides power to replenish the energy stored in all energy storage devices of control 10. In contrast, charging power source 132 provides an initial power pulse to charge up all the energy storage devices to their preselected values. As discussed above, when recloser switches 12A, 12B, and 12C close, a momentary power pulse is provided to multibus power supply 40 by means of solenoid secondary 14B. Solenoid 14B has filter 174 connected across its terminals which are connected to charging rectifier 176. The cathode of rectifier 176 is connected to negative power bus 38. The anode of rectifier 176 establishes charging reset line 134 and is connected to positive power bus 36 through choke 178 and isolating charging diode 180. When a power pulse occurs it is conveyed to each energy storage device for storage.

Figure 7:
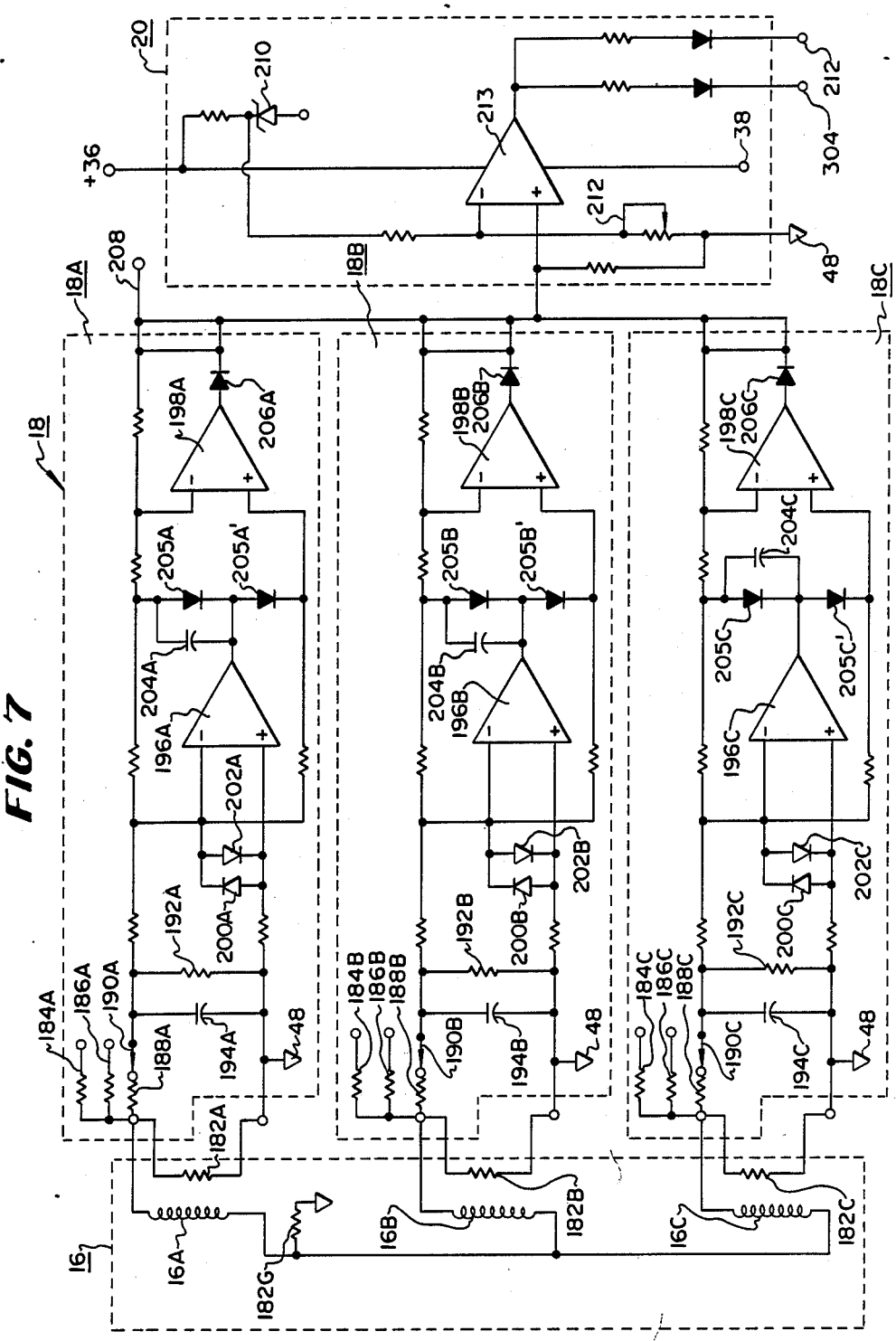
FIG. 7 illustrates phase peak generator and level detector portions of the control.

FIG. 7 illustrates the circuitry in phase peak generators 18A,B,C and phase level detector 20, generally shown in FIG. 2. Since the circuitry employed in phase peak generators 18A,B,C is identical for each phase, only phase peak generator 18A for phase A will be discussed. Current transformer 16A, located in current sensing means 16, supplies current to a phase secondary resistor 182A. Both current transformer 16A and phase secondary resistor 182A are physically located in current sensing means 16 in close association with switchgear 12. The current sensing signal they generate is presented to one of a plurality of phase minimum trip resistors 184A,186A,188A selected by phase minimum trip selector switch 190A. Phase minimum trip selector switch 190A allows variation of a fault level which will initiate fault timing in phase timing means 24. Phase minimum trip resistor 182A, 184A, and 186A form a voltage divider with sensing resistor 192A to generate a signal of approximately 100 millivolts when timing is to be initiated by a certain fault level. Sensing resistor 192A is bypassed by bypass capacitor 194A. The signal generated across sensing resistor 192A is presented to a precision rectifier circuit similar to that shown and described in FIG. 5-9 on page 193 of *IC OP AMP Cookbook*, by Walter G. Jung, published in 1977. In general, a full wave precision rectifier is achieved by summing the output of a precision half wave rectifier and its input with the proper phase and amplitude relations. A precision half wave rectifier employs an operational amplifier and rectifying diodes to generate a precise half wave rectifier signal over an extended range. The output of phase precision half wave rectifier 196A is summed with its input, in phase summing operational amplifier 198A. Improvements to the basic precision rectifying circuit, illustrated in the above-referenced publication, include a first phase anti-parallel diode 200A and a phase second anti-parallel diode 202A, to protect the input to phase precision half wave rectifier 196A. When the transients rise fast enough to exceed the slew rate of phase precision half wave rectifier 196A, anti-parallel diodes 200A,202A conduct to protect the inputs to the precision rectifying circuits. Additionally, the output of precision half wave rectifier 196A is bypassed by linearization capacitor 204A. Phase linearization capacitor 204A provides a shunt path for high frequency components of the output around phase feedback diodes 205A and 205A' to prevent oscillation of precision rectifier operational amplifier 196A. Phase isolating diode 206A allows the interconnection of the phase peak generators 18A,B, and C, while avoiding interaction among them. As a result, the signal appearing at the output 208 of phase peak generator 18 is always the highest in magnitude among the outputs of the phase peak generators 18A,B,C. The magnitudes of the signals are referenced to zero volts established on neutral bus 48.

Phase level detector 20 is a conventional bang bang amplifier the reference level of which is established by minimum trip Zener 210 operationally connected between power buses 36,38 and minimum trip trimmer 212. When the voltage appearing at phase peak generator output 208 rises above 100 millivolts, or whatever preselected voltage chosen, level operational amplifier 213 immediately provides a signal equal in magnitude to positive power bus voltage 36. This level present signal is presented through isolated conductor 304 to the reset input 64R of reset timer 64 to inhibit reset when a overcurrent condition exists. It is also presented to isolated output level 212 where it enables the commencement of timing in phase timing means 24.

Phase peak generator output 208 is additionally presented to phase timing current means 22, as shown in FIG. 8 of the drawing. Phase timing current means 22 is conveniently described as including a buffered peak detector and employs buffer operational amplifier 214, voltage follower operational amplifier 216, followed by source amplifier 218 and source transistor 220. The buffered peak detector stage of phase timing current means 22 is conventional, as shown and described on page 196 of FIG. 5-13 of *IC OP AMP Cookbook*, by Walter G. Jung, published in 1977. In brief summary, buffer operational amplifier 214 charges up peak capacitor 222, to a value equal to the maximum signal from a phase peak generator output 208. Voltage follower operational amplifier 216 reduces the bleedoff leakage of peak capacitor 222 and provides a peak signal to source amplifier 218 which acts as a current source for source transistor 220. The phase current magnitude signal output of phase timing current means 22 is proportional to the maximum magnitude of the phase peak generator output 208 and is provided to phase timing means 24 through conductor 224. Current sensing means 16, phase level detector 20, and phase timing current means 22 act in conjunction as a sensing means for determining the presence of a preselected level of current in any phase of the distribution line and provides a current present signal by means of conductors 212 and 224 to phase trip timing means 24. Ground timing current means 32 is virtually identical in circuitry and function to phase timing current means 22 and is not further discussed.

In contrast, ground peak generator means 28, shown in FIG. 9, differs in a number of respects from phase peak generator means 18, shown in FIG. 7. These differences reflect the differences in magnitudes between ground and phase faults and their effects. However, similarly functioning components in ground peak generator 28 are numbered the same as their counterparts in phase peak generator 18 and are distinguished by the suffix G, rather than suffixes A,B, or C. Ground secondary resistor 182G is, of course, not associated with the secondary of a current transformer, since there is no ground current transformer, but is connected between the common point of the star connection among current transformers 16A,B,C and the neutral bus 48. The voltage appearing across ground secondary resistor 182G is reflective of any ground currents that may exist in the power distribution line. Basically, ground peak generator 28 includes a selectable gain amplifier 226 operatively connected to a ground precision half wave rectifier 196G and a ground summing operational amplifier 198G. The voltage generated across sensing resistor 192G is approximately millivolt per amp of line current. In accordance with the ground minimum trip resistor selected by minimum trip selector switch 190G, selectable gain amplifier 226 amplifies this voltage at one of two selectable gains selected by gain switch 228 in a feedback path around selectable gain amplifier 226. In the position shown in FIG. 9, gain switch 228 causes 20 millivolts to appear at the output of amplifier 226 for each millivolt appearing across secondary resistor 182G. In the alternate position, the gain is increased by a factor of five, so that 100 millivolts appears at the output of amplifier 226 for each millivolt of input. In some applications, it is desirable to eliminate ground fault tripping. This may be done by opening ground block switch 230. The operation of the remainder of ground peak generator 28 generating a ground peak signal is the same as phase peak generators 18A,B,C in generating a phase peak signal. When 100 millivolts appears at the ground output 232 of the ground summing operational amplifier 198G, the ground level detector 30 is enabled. Ground level detector 30 functions in the same manner as phase level detector 20 and will not further be discussed. Since there is only one ground, there is no need for a counterpart to phase isolating diode 206A. Likewise, ground current timing means 32 in providing a ground current magnitude signal need not be discussed, since it functions in the same manner as phase current timing means 22.

Figure 10:
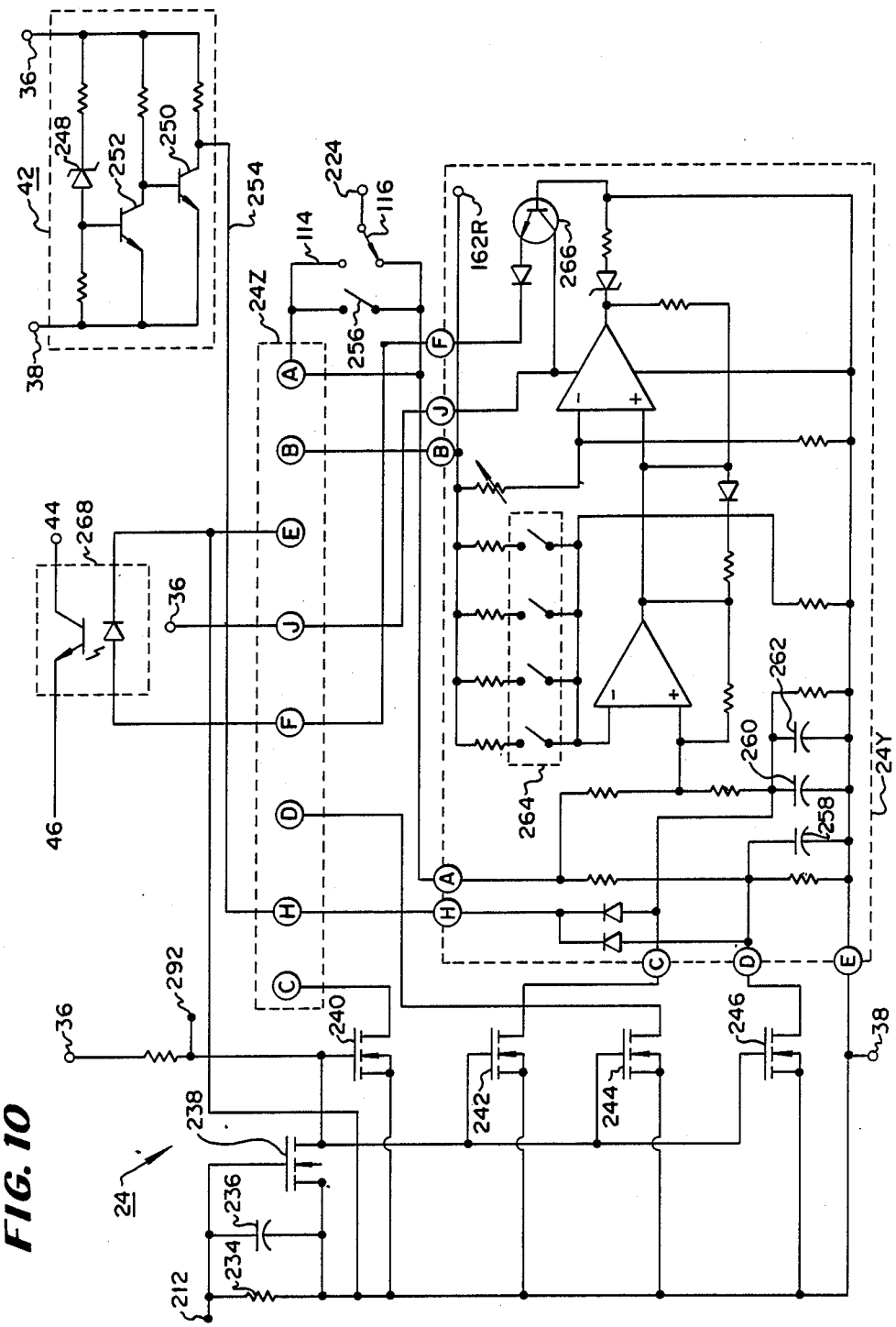
FIG. 10 illustrates a phase timing means portion of the control.

Similarly, phase timing means 24 and ground timing means 34 are substantially identical in construction. In FIG. 10 the circuits of phase timing means 24 and timing inhibit means 42 are shown. Two inhibit signals are received by phase timing means 24 either of which prevent timing in first phase timing plug 24Y or second phase timing plug 24Z.

Isolated output level 212 from phase level detector 20 may consist of a very narrow pulse every half cycle or pulses throughout a half cycle in accordance with the level of fault existing in the distribution line. The pulses are filtered through a resistive capacitive network consisting of filter resistor 234 and filter capacitor 236. When isolated output level 212 goes positive, control Field Effect Transistor (FET) 238 conducts turning off capacitor FETs 240,242,244, and 246. Each capacitor FET, when conducting, prevents charge accumulation on timing capacitors in timing plugs 24Y,24Z.

The second inhibit signal received by phase timing means 24 issues from timing inhibit means 42. When the voltage between power buses 36,38 exceeds 17 volts reliable operation of flux shift tripper 135 is assured. Under that condition, inhibit Zener 248 conducts. When inhibit Zener 248 conducts, it effectively ties the base of inhibit transistor 250 to the negative power bus 38 by causing intermediate transistor 252 to conduct. When the voltage does not exceed 17 volts, inhibit transistor 250 turns on and ties voltage inhibit line 254 to the negative power bus 38, which also prevents an accumulation of charge on the capacitors contained in timing plugs 24Y and 24Z. Timing plug 24Y is shown in detail in FIG. 10. However, timing of plug 24Z is only generally shown since it is of identical construction. In accordance with the selection made in time delay selector means 104, first phase contact 116 is illustrated as directing phase timing current generated in phase timing current means 22 through conductor 224 to first timing plug 24Y. Cold load pickup switch 256 enables an operator to extend timing by connecting first and second timing plugs 24Y and 24Z in parallel, when the recloser is closed into a line which has not conducted current for an extended time. When closing under those conditions, a significant inrush current inevitably occurs which is of short duration and may appear as a fault. Phase timing current charges timing capacitors 258,260,262 at a rate proportional to its magnitude. Under some conditions when timing is to be independent of current a fixed reference in lieu of phase timing current may be used to charge timing capacitors. When the voltage across the timing capacitors exceed a voltage selected by phase timing switch 264, phase output transistor 266 conducts. Conduction of phase output transistor 266 turns on optical coupler 268. Optical coupler 268 provides a means of coupling the current duration signal generated in phase 24 or ground 34 timing means to circuitry powered by positive 44 and negative 46 energy buses, while maintaining isolation from power buses 36,38.

Figure 11:
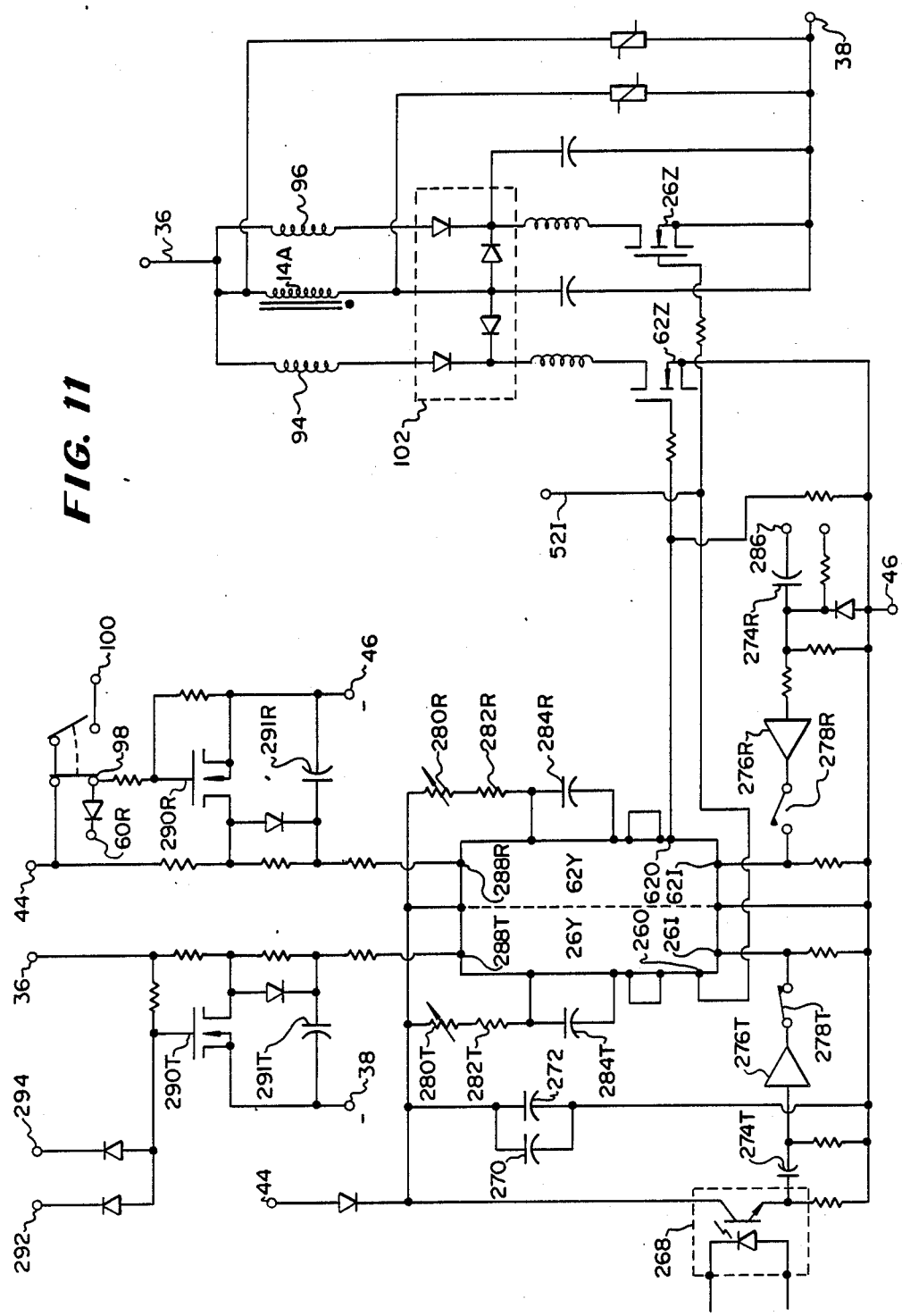
FIG. 11 illustrates pulse shaping and logic circuitry used in generating control signals.

FIG. 11 shows pulse shaping and logic circuitry associated with both the trip and the closing signals of control 10. As is indicated, trip pulse generator 26Y and reclose pulse generator 62Y are shared functions of a single chip which is a dual monostable multi-vibrator. Each independent pulse generator generates a pulse of an appropriate width and shape to activate their respective solid state switches 26Z and 62Z. Power is supplied to the chip from positive and negative energy buses 44,46. Capacitors 270,272 merely filter the power supply to the chip. When optical coupler 268 conducts, its output is differentiated by capacitor 274T and presented to the input terminal 26I of trip pulse generator 26Y through buffer 276T and second close reset contact 278T. Buffer 276T assures that a narrow input pulse of the appropriate shape and amplitude is presented to the input 26I of trip pulse generator 26Y. Second close reset contact 278T is controlled by switch state memory 50 and operates with close reset contact 98 to assume the same state. As shown in FIG. 11, second close reset contact 278T is closed as a result of a lockout or a close signal last issued by control 10. If a trip signal were the last signal generated by control 10, contact 278T would be open and thereby prevent false trip triggering from transients arising with a reclose signal. When the input 26I to the monostable multi-vibrator of trip pulse generator 26Y is strobed, a 15 millisecond trip pulse is generated at its output 260 to trigger solid state trip switch 26Z. Trip switch 26Z issues a trip signal which causes opening of the distribution line switches 12A,B,C, by activating flux shift tripper coil 14A. The period of the output of trip pulse generator 26Y is determined by timing resistors 280T,282T and timing capacitor 284T. Operation of reclose pulse generator 62Y is nearly identical to the operation of trip pulse generator 26Y and similarly numbered components perform similar functions. A principle difference between the operation of reclose pulse generator 62Y from the operation of trip pulse generator 26Y is that its reclose phase output has a period of 20 milliseconds. Reclose pulse generator 62Y input is generated within reclose interval timer 60 and provided to the monostable input 62I through reclose input 286. Second trip reset contact 278R is always in an opposite state from that of second close reset contact 278T and in the same state as trip reset contact 100.

Inhibit functions associated with the respective pulse generators 26Y,62Y differ in input conditions, but are achieved through similar means also. When control lines leading to reset terminals 288T,288R are low, generation of a pulse in the associated monostable vibrator is inhibited. The state of reset terminals 288T,R is controlled by pulse trip and reclose solid state switches 290T,290R. Trip pulse generation should be inhibited when the power bus 36,38 voltage is low, and when no fault is present by trip pulse inhibit means. Accordingly, conductors 292,294 are connected to the drains of control FETs 238 in their respective timing means 24,34. When capacitor 291T is insufficiently charged or is discharged through pulse trip switch 290T, the reset terminal is low enough to inhibit pulse generation. Reclose pulse generation should be inhibited whenever the last control signal was a reclose signal by reclose pulse inhibit means. Switch state memory 50 contact 98 achieves this function in conjunction with close pulse solid state switch 290R.

Figure 12:
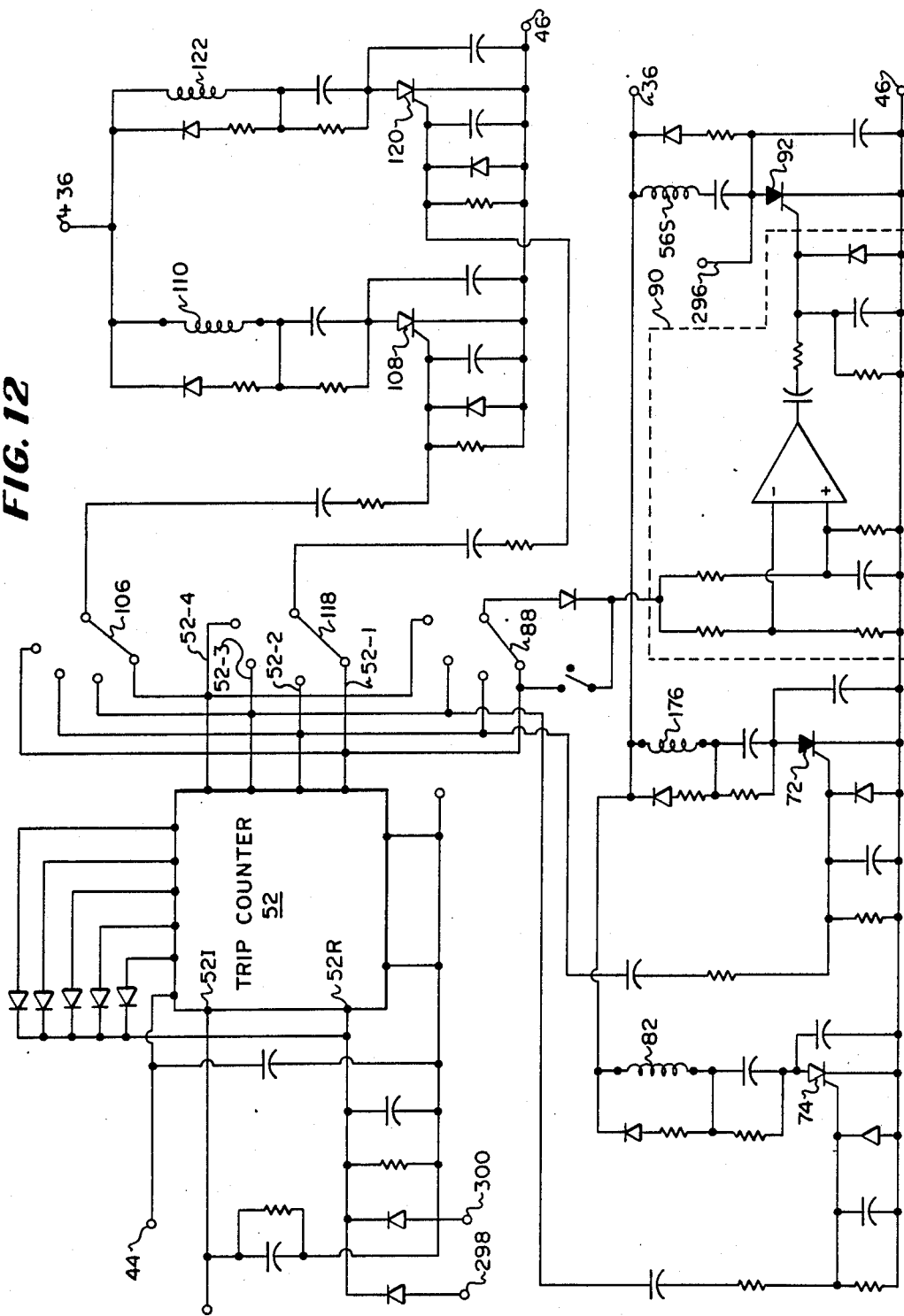
FIG. 12 shows a trip counter portion of the control.
Figure 13:
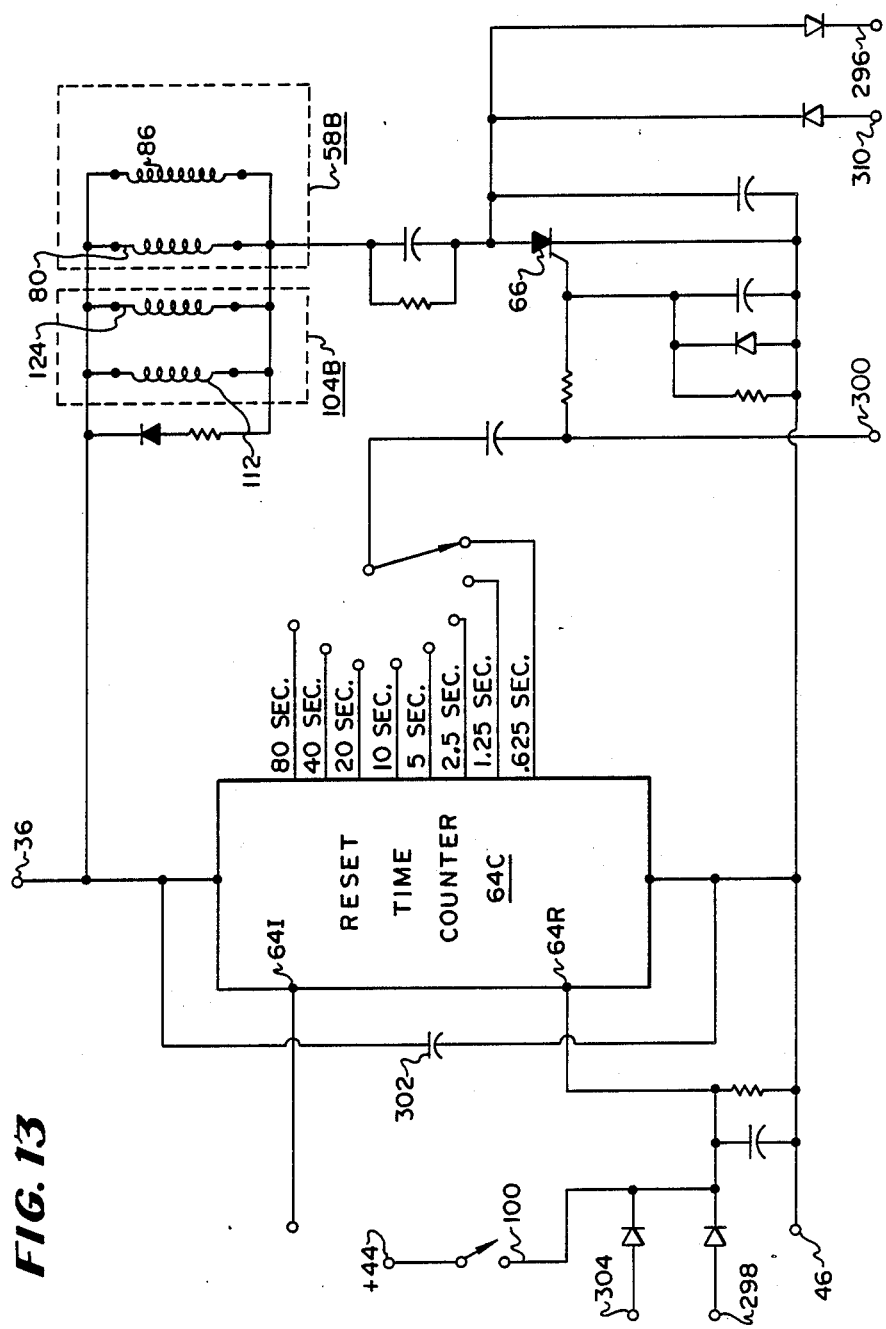
FIG. 13 illustrates reset timer and reset means portions of the control.

In addition to going to solid state trip switch 26Z, the output pulse of trip pulse generator 26Y also goes to trip counter 52, as indicated in FIG. 12. The output pulse advances the trip count in the trip counter 52 and ultimately causes initiation of lockout delay means 90 when the trip count selected by lockout selector switch 88 is reached. Lockout delay means 90 causes a 75 millisecond delay in energizing lockout activator 92 after a trip signal is generated by solid state trip switch 26Z. The purpose of this delay is to allow switchgear 12 to assume an appropriate position, such that energization of flux shift tripper coil 14A through lockout line 296 will cause a lockout condition in recloser 12, rather than a reclose. Energization of lockout activator 92 also energized set coil 56S of lockout target 56 causing the target to be displayed. Although shown as a single connection in FIG. 2, reset of trip counter 52 is from reset means 66 and initializer 68 is, in fact, achieved through isolated conductors 298,300.

As previously discussed, trips should not be accumulated in trip counter 52 past a preselected interval and must be reset. A detailed showing of reset timer 64 and reset means 66 is set forth in FIG. 13. Reset time counter 64C obtains power from positive bus 36 and negative bus 46. Filter capacitor 302 bypasses any transients which may exist in the buses around reset time counter 64C. Reset time counter 64C receives a square wave signal of 25.6 Hertz from Oscillator 70 at input 64I. Counting is inhibited by switch state memory 50 contact 100 which is closed when the last signal issued by control 10 is a trip signal. Closure of contact 100 applies the positive bus voltage to reset timer reset 64R. Similarly, counting is also inhibited by the existence of a ground or phase fault through conductor 304. Likewise, the counter is inhibited by the existence of an initializing signal from initializer 68 through conductor 298. When a close signal is issued by control 10, contact 100 opens allowing reset time counter 64C, to commence timing. A plurality of reset time counter outputs representing count times ranging from 0.625 seconds to 80 seconds may be selected by reset time selector switch 308. When that interval has elapsed trip counter 52 is reset through its reset input 52R and reset means 66 conducts. Conduction of reset means 66 causes activation of reset coils contained in trip memory 58B and time delay selector means 104B. Additionally, the lockout target reset coil 56R is activated resetting lockout target 56 through conductor 310.

Figure 14:
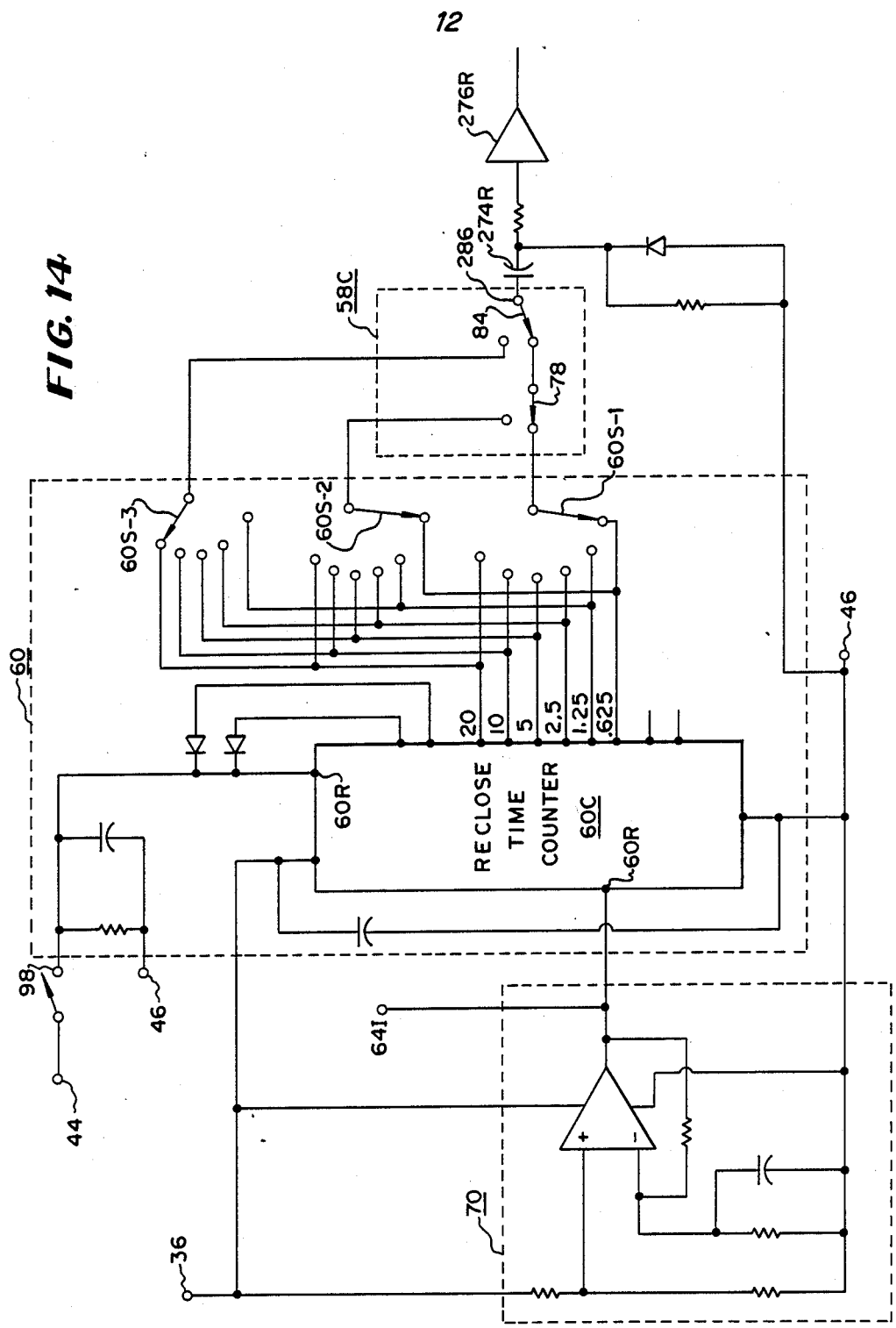
FIG. 14 illustrates oscillator and reclose interval timer portions of the control.

FIG. 14 illustrates square wave oscillator 70 and reclose interval timer 60. The frequency of square wave oscillator 70 is determined by resistor 312 and capacitor 314 to produce a square wave output at the rate of 25.6 Hertz. Reclose counter 60C is inhibited from counting by close reset contact 98 which supplies a positive input to reclose reset 60R, until a trip signal is issued by control 10. When a trip signal is issued, reclose counter 60C begins counting and provides selective outputs in the range of 0.625 seconds to 20 seconds. These counter outputs may be selected by the operator, by means of recloser delay switch is 60S-1,60S-2, and 60S-3, to provide appropriate reclose delays following the first, second and third trip signals. The appropriate output is a reclose interval signal and is channeled to reclose pulse generator 62Y through conductor 286. Second trip contact 78 and third trip contact 84 in trip memory 58C select the second and third delay as is appropriate.

Figure 15:
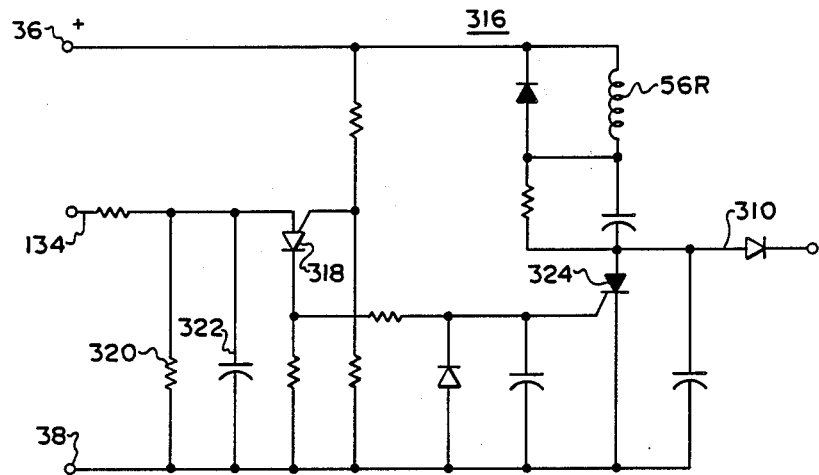
FIG. 15 illustrates a lockout reset portion of the control.

On switchgear 12 closing, charging power source 132 replenishes the energy storage means of control 10 in a manner previously described. Additionally, the lockout target 56 is reset through lockout reset circuitry 316, shown in FIG. 15. When charging reset line 134 is activated, programmable unijunction transistor 318 conducts after 10 millisecond time delay determined by resistor 320 and capacitor 322. When transistor 318 conducts Silicon Controlled Rectifier 324 fires, lockout reset coil 56R conducts to reset lockout target 56. Lockout reset coil 56R may also be grounded through conductor 310 by reset means 66.

Figure 16:
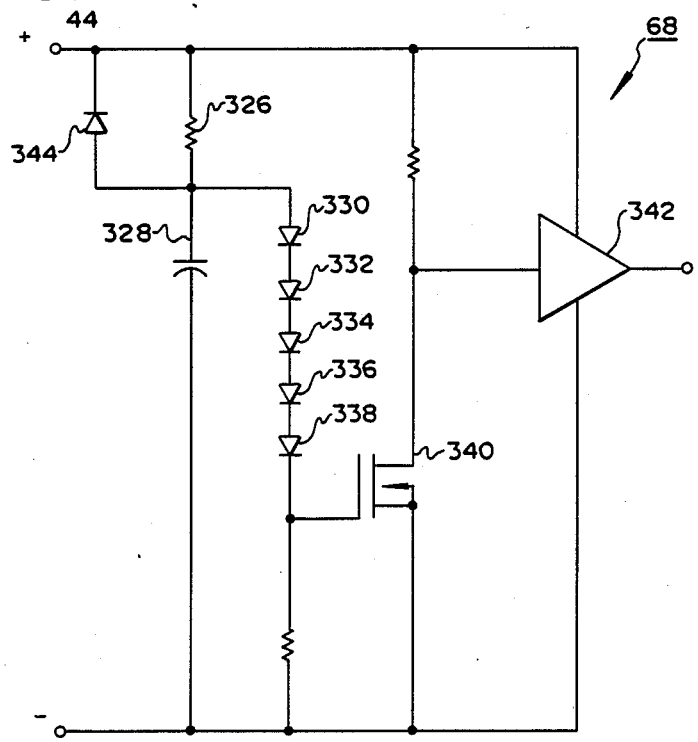
FIG. 16 illustrates an initializer means portion of the control.

If a bus voltage between positive 44 and negative 46 energy buses drops below five volts, transients associated with closing the switches of switchgear 12 could cause an undefined state in trip counter 52, reclose timer means 60, or reset time counter 64. To avoid an improper sequence of operations, which could then result, initialization means 68, shown in FIG. 16, resets all the counting and memory circuits. In normal operation, this circuit is inoperative. The initialization means 68 operates by causing a time delay between the rise of the energy buses 44,46 voltage and the sensing of the existence of at least five volts between the buses. Initialization resistor 326 and initialization capacitor 328, in conjunction with initialization diodes 330,332,334,336, and 338, delay the turn on of initialization FET switch 340. Before FET 340 turns on, the output of buffer 342 follows the voltage of positive energy bus 44 providing a reset signal directly to trip counter 52 and reset time counter 64. Reclose time counter 60C is reset through the action of reset means 66 and switch state memory means 50, if it has not already been reset by the close signal earlier issued, which closes reclose reset contact 98. When the voltage between energy buses 44 and 46 decreases, following diode 344 discharges initialization capacitor 328 into the buses.

It should be understood that various modifications, changes, and variations may be made in the arrangement, operation, and details of construction of the elements disclosed herein without departing from the spirit and scope of this invention.

I claim:
1. A distribution line switchgear control comprising:
a power source operatively connected to at least one phase of the distribution line for replenishing the power consumed by said switchgear control;
a charging power source operatively connected to at least one phase of the distribution line for supplying sufficient power to establish a preselected initial energy level in said switchgear control;
power rectifier means for rectifying alternating current obtained from the distribution line;
a positive power bus operatively connected to an anode of said rectifier means;
a negative power bus operatively connected to a cathode of said rectifier means;
a voltage regulating means governing a maximum voltage difference between said positive and negative power buses;
a trip energy storage device connected between said negative and positive power buses for storing trip energy;
a reclose energy storage device, is gated from said trip energy storage device, having two terminals, a first terminal of which is connected to a power bus;
a reclose energy bus connected to a second terminal of said reclose storage device;
a reclose diode connected between the second terminal of said reclose energy storage device and the other power bus, said recloser diode oriented to prevent said reclose energy storage device from discharging into the power buses;
a reserve energy storage device having two terminals, a first terminal of which is connected to a terminal of said reclose energy storage device;
a reserve energy bus connected to a second terminal of said reserve energy storage device;
a reserve diode connected between the second terminal of said reserve energy storage device and the other terminal of said reclose energy storage device, said reserve diode oriented to prevent said reserve energy storage device from discharging into the other terminal of said reclose energy storage device, said reserve, reclose and trip energy storage devices establishing a energy level of said switchgear control;

sensing means for determining the presence of preselected level of current in each phase of the distribution line and for providing a current present signal when a preselected value of current is present or exceeded by the distribution line current;

trip timing means responsive to the current present signal for determining the presence and duration of the current present signal, and for providing a current duration signal when the duration of the current present signal exceeds a preselected current time interval;

trip means connected between said positive and said negative power bus and responsive to the current duration signal for issuing a trip signal which causes a switch in the switchgear to open;

a trip counter powered by said energy buses for counting the number of times a trip signal is issued the sequential outputs of the trip counter being selectable to activate the various control sequential operating devices;

a trip memory which retains a non-volatile record of the number of times a trip signal is issued;

a reclose interval timer, powered by said energy buses, for determining a preselected reclose interval from a defined event and issuing a reclose interval signal;

reclose means connected to said reclose bus and responsive to the reclose interval signal for issuing a close signal which causes the switch of the switchgear to close;

a reset timer, powered by said energy buses, for determining the reset interval after a close signal and issuing a reset interval signal which returns said trip counter to its initial state;

timing inhibit means for monitoring the voltage between said power buses to determine whether the power bus voltage exceeds a preselected minimum power bus voltage and for issuing an inhibit signal which prevents the issuance of a trip signal if the power bus voltage is less than the minimum power bus voltage;

an initializer for monitoring the voltage between the energy buses to determine whether the energy bus voltage exceeds a preselected minimum energy bus voltage and for issuing an initialization signal shortly before the energy bus voltage exceeds the minimum energy bus voltage, the initialization signal returning volatile state devices including said trip counter to its initial state;

state memory means, which is non-volatile and relatively coercive, said state memory means responsive to the trip and the close signals for inhibiting said reset timer and enabling said reclose interval timer, when a trip signal was lost issued, and for enabling said reset timer and inhibiting said recloser interval timer when the trip signal was not the last issued, said timers being returned to their initial states when inhibited; and reset means responsive to the reset interval signal and the initialization signal to return all non-volatile state devices including said trip memory and said state memory to their initial states.

2. A distribution line switchgear control as claimed in claim 1 wherein:

said voltage regulating means includes an even number of voltage regulating devices, each voltage regulating device having an anode and cathode, and successive voltage regulating devices are connected to each other—cathode to anode;

said reserve energy storage device is a capacitor; and said switchgear control further includes a neutral bus connected to a junction between successive voltage regulating devices which is midway in voltage between the voltage difference between said positive and negative power buses.

3. A distribution line switchgear control as claimed in claim 1 wherein:

said trip energy storage device comprises a plurality of trip capacitors, each trip capacitor having a first and a second terminal, and successive trip capacitors are connected together—second terminal to first terminal;

said reclose energy storage device comprises a plurality of reclose capacitors connected to each other in parallel;

said charging power source includes a solenoid secondary, the primary of which is momentarily energized by switches closed by the controlled switchgear;

a filter connected to terminals of said solenoid secondary; and a charging rectifier operatively connected to said solenoid secondary for conducting charging power into said power buses.

4. A distribution line switchgear control as claimed in claim 1, wherein said initializer includes:

an initialization resistor connected to one energy bus;

an initialization capacitor connected between said initialization resistor and the second energy bus;

a following diode shunting said initialization capacitor and oriented to discharge said initialization capacitor into said energy buses when the energy bus voltage falls below that of said initialization capacitor;

a buffer operatively connected to an energy bus for providing an initialization signal which follows an increase in voltage between said energy buses;

an initialization switch connected to said buffer for terminating said initialization signal as the energy bus voltage exceeds the minimum energy bus voltage; and an initialization diode connected between the junction of said initialization resistor and said initialization capacitor, and said initialization switch which causes said initialization switch to terminate the initialization signal when the minimum bus voltage exists.

5. A distribution line switchgear control as claimed in claim 2, wherein:

said power source includes three Y connected current transformers, each connected to a different phase of the transmission line;

an even number of trip capacitors, each trip capacitor having a first and a second terminal, and successive trip capacitors are connected together—second terminal to first terminal, half of the total number of said trip capacitors connected between a first power bus and said neutral bus, and the second half of the total number of said trip capacitors being connected between said neutral bus and second power bus;

said reclose energy storage device comprises a plurality of reclose capacitors connected to each other in parallel; and said switchgear control further includes:
a resistor connected to a first power bus; and
a timing Zener connected between said resistor and a second power bus for establishing a referenced voltage employed in said trip timing means, said referenced voltage of a magnitude approximately midway in voltage between said neutral bus voltage and said power bus voltage.

* * * * *